(12) United States Patent
Zheng et al.

(10) Patent No.: US 11,211,606 B2
(45) Date of Patent: Dec. 28, 2021

(54) ELECTRODE FOR BATTERY AND FABRICATION METHOD THEREOF

(71) Applicant: THE HONG KONG POLYTECHNIC UNIVERSITY, Hong Kong (CN)

(72) Inventors: Zijian Zheng, Hong Kong (CN); Dongrui Wang, Hong Kong (CN)

(73) Assignee: THE HONG KONG POLYTECHNIC UNIVERSITY, Hong Kong (CN)

( * ) Notice: Subject to any disclaimer, the term of this patent is extended or adjusted under 35 U.S.C. 154(b) by 95 days.

(21) Appl. No.: 16/121,686

(22) Filed: Sep. 5, 2018

(65) Prior Publication Data

US 2019/0207218 A1 Jul. 4, 2019

Related U.S. Application Data

(60) Provisional application No. 62/610,977, filed on Dec. 28, 2017.

(51) Int. Cl.
*H01M 4/74* (2006.01)
*H01M 4/66* (2006.01)
(Continued)

(52) U.S. Cl.
CPC ....... *H01M 4/5825* (2013.01); *C23C 18/1644* (2013.01); *C23C 18/1653* (2013.01);
(Continued)

(58) Field of Classification Search
None
See application file for complete search history.

(56) References Cited

U.S. PATENT DOCUMENTS 5,494,762 A * 2/1996 Isoyama ............... H01M 50/24
429/221
6,097,607 A 8/2000 Carroll et al.
(Continued)

FOREIGN PATENT DOCUMENTS

CN 1805189 A 7/2006
CN 204088469 U 1/2015
(Continued)

OTHER PUBLICATIONS

Yu, Zheyin, et al. "High Areal Capacitance and Rate Capability Using Filled Ni Foam Current Collector." Electrochimica Acta, vol. 281, Jun. 2, 2018, pp. 761-768., doi:10.1016/j.electacta.2018.06.007. (Year: 2018).*

(Continued)

*Primary Examiner* — Ula C Ruddock
*Assistant Examiner* — Amanda Rosenbaum
(74) *Attorney, Agent, or Firm* — Spruson & Ferguson (Hong Kong) Limited

(57) ABSTRACT

An electrode for a battery, comprising an active material and a metallic fabric is disclosed. The metallic fabric comprises fibers being at least partially covered by a coating of nickel or copper, which comprises a layer and a plurality of protrusions protruding from the layer. The active material is attached on the protrusions. The metallic fabric provides a high electrical conductivity and a high mechanical stability, and demonstrates outstanding performance for the use as a current collector of battery.

8 Claims, 33 Drawing Sheets

(51) Int. Cl.
| | |
|---|---|
| *H01M 4/58* | (2010.01) |
| *H01M 4/525* | (2010.01) |
| *H01M 4/04* | (2006.01) |
| *H01M 10/0525* | (2010.01) |
| *C25D 7/00* | (2006.01) |
| *C25D 3/58* | (2006.01) |
| *C25D 3/12* | (2006.01) |
| *H01M 4/131* | (2010.01) |
| *C23C 18/16* | (2006.01) |
| *C23C 18/34* | (2006.01) |
| *H01M 4/38* | (2006.01) |
| *C23C 18/30* | (2006.01) |
| *H01M 4/485* | (2010.01) |
| *C23C 18/20* | (2006.01) |
| *C23C 18/40* | (2006.01) |
| *H01M 4/136* | (2010.01) |
| *C25D 3/56* | (2006.01) |
| *H01M 4/505* | (2010.01) |
| *H01M 4/02* | (2006.01) |

(52) U.S. Cl.
CPC .......... *C23C 18/2086* (2013.01); *C23C 18/30* (2013.01); *C23C 18/34* (2013.01); *C23C 18/405* (2013.01); *C25D 3/12* (2013.01); *C25D 3/562* (2013.01); *C25D 3/58* (2013.01); *C25D 7/00* (2013.01); *H01M 4/0402* (2013.01); *H01M 4/0404* (2013.01); *H01M 4/0452* (2013.01); *H01M 4/131* (2013.01); *H01M 4/136* (2013.01); *H01M 4/38* (2013.01); *H01M 4/382* (2013.01); *H01M 4/386* (2013.01); *H01M 4/485* (2013.01); *H01M 4/661* (2013.01); *H01M 4/667* (2013.01); *H01M 4/747* (2013.01); *H01M 10/0525* (2013.01); *H01M 4/505* (2013.01); *H01M 4/525* (2013.01); *H01M 2004/021* (2013.01); *H01M 2004/027* (2013.01); *H01M 2004/028* (2013.01)

(56) References Cited

U.S. PATENT DOCUMENTS

| | | |
|---|---|---|
| 6,432,576 B1 | 8/2002 | Hikmet |
| 8,552,861 B2 | 10/2013 | Bastide et al. |
| 9,040,189 B2 | 5/2015 | Kwon et al. |
| 9,048,501 B2 | 6/2015 | Kwon et al. |
| 9,054,386 B2 | 6/2015 | Kwon et al. |
| 9,065,143 B2 | 6/2015 | Kwon et al. |
| 9,070,952 B2 | 6/2015 | Kwon et al. |
| 9,077,048 B2 | 7/2015 | Kwon et al. |
| 9,083,060 B2 | 7/2015 | Kwon et al. |
| 9,083,061 B2 | 7/2015 | Kwon et al. |
| 9,118,084 B2 | 8/2015 | Kwon et al. |
| 9,130,236 B2 | 9/2015 | Kwon et al. |
| 9,130,247 B2 | 9/2015 | Kwon et al. |
| 9,142,865 B2 | 9/2015 | Kwon et al. |
| 9,203,104 B2 | 12/2015 | Kwon et al. |
| 9,214,672 B2 | 12/2015 | Kwon et al. |
| 9,293,783 B2 | 3/2016 | Kwon et al. |
| 9,299,989 B2 | 3/2016 | Kwon et al. |
| 9,324,978 B2 | 4/2016 | Kwon et al. |
| 9,367,087 B1 | 6/2016 | Townsend et al. |
| 9,397,344 B2 | 7/2016 | Kwon et al. |
| 9,406,939 B2 | 8/2016 | Kwon et al. |
| 9,413,030 B2 | 8/2016 | Kwon et al. |
| 9,413,032 B2 | 8/2016 | Wei et al. |
| 9,471,102 B2 | 10/2016 | Townsend et al. |
| 9,490,658 B2 | 11/2016 | Wei et al. |
| 9,590,241 B2 | 3/2017 | Kwon et al. |
| 9,660,289 B2 | 5/2017 | Kwon et al. |
| 9,665,755 B2 | 5/2017 | Myers et al. |
| 2005/0064291 A1* | 3/2005 | Sato ............... H01M 4/38 429/233 |
| 2016/0156071 A1 | 6/2016 | Yamakaji et al. |
| 2016/0248083 A1 | 8/2016 | Ozeki |

FOREIGN PATENT DOCUMENTS

| | | | |
|---|---|---|---|
| CN | 104752731 A | | 7/2015 |
| CN | 204441392 U | | 7/2015 |
| CN | 105762365 A | * | 7/2016 |
| CN | 105762365 A | | 7/2016 |
| CN | 103904366 B | | 8/2016 |
| CN | 105914359 A | | 8/2016 |
| CN | 106058266 A | | 10/2016 |
| CN | 106058308 A | | 10/2016 |
| CN | 106450479 A | | 2/2017 |
| CN | 106898729 A | * | 6/2017 |
| CN | 106898729 A | | 6/2017 |
| JP | 5822347 B2 | * | 11/2015 |
| KR | 10-2016-0063992 A | | 6/2016 |

OTHER PUBLICATIONS

Sandhya, C.P. et al. "Lithium Titanate as Anode Material for Lithium-Ion Cells: A Review." Ionics, vol. 20, 601-620 (2014). https://doi.org/10.1007/s11581-014-1113-4 (Year: 2014).*

International Search Report and Written Opinion of PCT application No. PCT/CN2018/119348 issued from the International Search Authority dated Feb. 27, 2019.

* cited by examiner

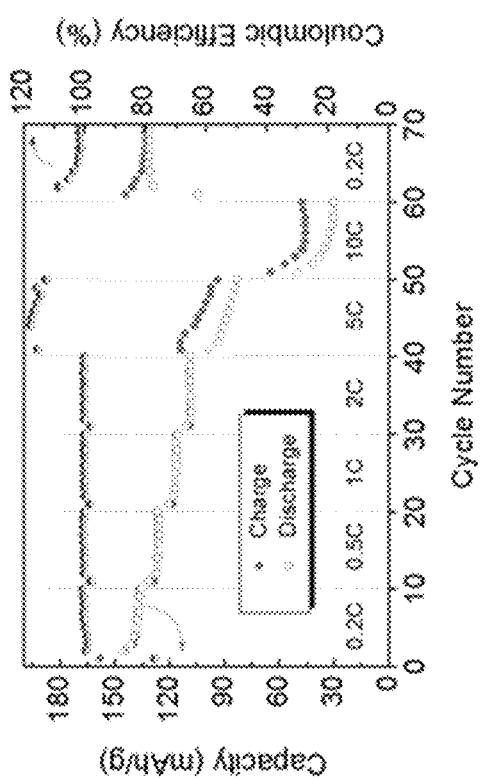
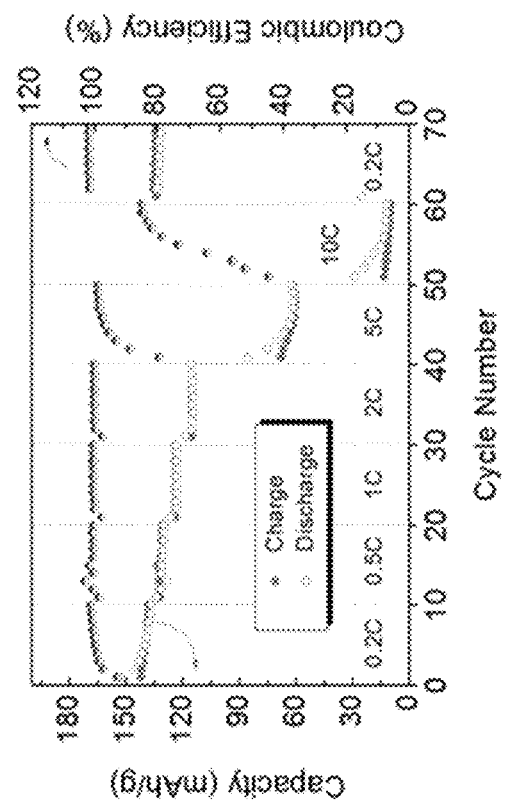
FIG. 19A
FIG. 19B
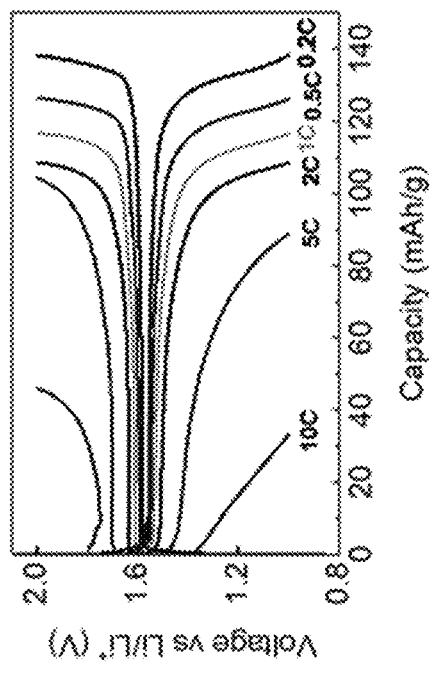
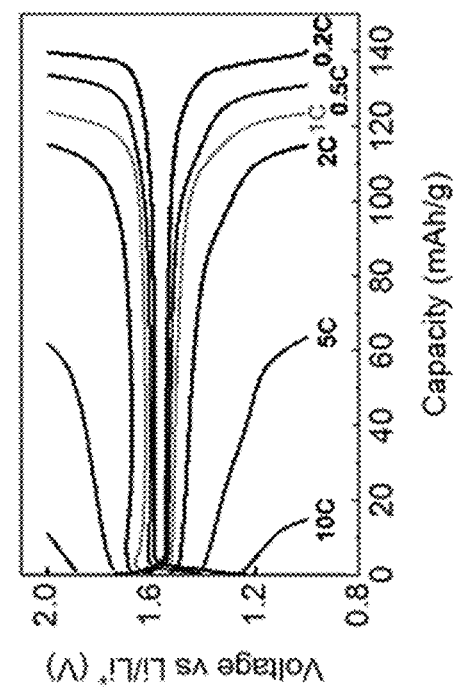

ELECTRODE FOR BATTERY AND FABRICATION METHOD THEREOF

CROSS-REFERENCE TO RELATED APPLICATIONS

This application claims the benefit of U.S. Provisional Patent Application No. 62/610,977, filed on Dec. 28, 2017, which is incorporated by reference herein in its entirety.

FIELD OF THE INVENTION

The present disclosure generally relates to an electrode, a method of fabricating the electrode, and a battery comprising the electrode. In particular, the present disclosure relates to an electrode comprising an active material and a metallic fabric.

BACKGROUND

Lithium-ion batteries (LIB) are a type of rechargeable battery in which lithium ions move from the anode to the cathode during discharge and return from the cathode to the anode when charging. LIBs are commonly used in a wide variety of applications and have occupied the throne of electrochemical energy storage for over 20 years, while such a situation is expected to continue for quite some time in the near future. Currently, intensive research is being carried out to develop better active materials with improved energy and power densities of LIBs in high energy applications. At the same time, wearable and flexible LIBs, which can undergo mechanical deformations including folding, twisting, stretching, and compressing, have also received considerable attention as an energy source for emerging flexible portable electronic devices.

The road to commercializing flexible LIBs has been challenging. Most flexible LIBs cannot withstand the complex and harsh wear and use conditions required for wearable LIBs, including folding, twisting, friction, impacting, washing, and other deformations. In particular, flexible LIBs fabricated by thinning the aluminum (Al) and copper (Cu) foils in conventional LIBs can only withstand a certain degree of bending, but not folding due to the low fatigue strength of these metals. Similarly, in other flexible LIBs utilizing carbon nanomaterial as the current collectors, the foregoing drawbacks are also present. Furthermore, the high electrical resistance of carbon reduces the electrochemical performance of flexible carbon nanomaterial based LIBs, making them far from ideal for wearable applications.

Accordingly, there is a need in the art to develop suitable electrodes as current collectors with both high electrical conductivity and good mechanical stability for fulfilling the requirements of flexible LIBs that are suitable for use in portable electronic devices and a wide variety of applications.

SUMMARY OF THE INVENTION

A first aspect of the present disclosure is to provide an electrode for a battery. The electrode comprises an active material and a fabric comprising one or more fibers. Each of the one or more fibers is being at least partially covered by a coating of nickel or copper, and the coating comprises a layer and a plurality of protrusions protruding from the layer, wherein the active material is attached at least on some of the protrusions. Advantageously, the fabric provides a high electrical conductivity and a high mechanical stability, and demonstrates outstanding performance for the use as a current collector of battery.

In certain embodiments, each of the protrusions has a height in a range of 100 nm to 5 µm.

In certain embodiments, each of the protrusions has a width in a range of 10 nm to 1 µm.

In certain embodiments, the layer of the coating of nickel has a thickness in a range of 1 µm to 5 µm.

In certain embodiments, the layer of the coating of copper has a thickness in a range of 100 nm to 1 µm.

In certain embodiments, the one or more fibers with the coating of nickel comprise an electrochemical active surface area having an areal capacitance in a range of 160 µF/cm$^2$ to 400 µF/cm$^2$.

In certain embodiments, the one or more fibers with the coating of copper comprise an electrochemical active surface area having an areal capacitance in a range of 400 µF/cm$^2$ to 1400 µF/cm$^2$.

In certain embodiments, each of the protrusions has a height in a range of 100 nm to 5 µm and a width in a range of 10 nm to 1 µm; and the layer of the coating of nickel has a thickness in a range of 1 µm to 5 µm and the layer of the coating of copper has a thickness in a range of 100 nm to 1 µm.

In certain embodiments, the active material is sulfur, silicon, lithium metal, lithium titanate, lithium iron phosphate, lithium cobalt oxide or lithium manganite.

Another aspect of the present disclosure is to provide a method for fabricating the electrode for a battery. The method comprises depositing nickel metal by an electroless deposition on one or more fibers to at least partially cover each of the one or more fibers with the layer; depositing nickel metal by an electrodeposition on each layer to form the plurality of protrusions to form the coating of nickel; and coating the active material on at least some of the nickel protrusions.

In certain embodiments, the electroless deposition comprises an electroless deposition bath comprising nickel with a concentration in a range of 15 g/L to 30 g/L, and an electroless deposition time in a range of 30 min to 2 hr.

In certain embodiments, the electrodeposition comprises an electrodeposition bath comprising nickel with a concentration in a range of 80 g/L to 130 g/L and ethylenediamine with a concentration in a range of 70 g/L to 110 g/L, an electrodeposition time in a range of 2 min to 30 min, a current density in a range of 40 mA/cm$^2$ to 60 mA/cm$^2$, and an electrodeposition temperature in a range of 50° C. to 90° C.

Yet another aspect of the present disclosure is to provide a method for fabricating the electrode for a battery. The method comprises depositing copper metal on one or more fibers by an electroless deposition to at least partially cover each of the one or more fibers with the coating of copper; and coating the active material on at least some of the copper protrusions.

In certain embodiments, the electroless deposition comprises an electroless deposition bath comprises copper with a concentration in a range of 1.0 g/L to 2.0 g/L, a pH in a range of 12 to 14, and an electroless deposition time is in a range of 2 hr to 6 hr.

In certain embodiments, the electroless deposition is a polymer-brush assisted electroless deposition.

Yet another aspect of the present disclosure is to provide a battery comprising the electrode of the present disclosure.

In certain embodiments, the active material is lithium iron phosphate; each of the one or more fibers are at least partially covered by the coating of nickel; each of the protrusions has a height in a range of 100 nm to 5 μm and a width in a range of 10 nm to 1 μm; and the layer of the coating of nickel has a thickness in a range of 1 μm to 5 μm.

In certain embodiments, the active material is lithium titanate; each of the one or more fibers are at least partially covered by the coating of copper; each of the protrusions has a height in a range of 100 nm to 5 μm and a width in a range of 10 nm to 1 μm; and the layer of the coating of copper has a thickness in a range of 100 nm to 1 μm.

Yet another aspect of the present disclosure is to provide an electrode for a battery. The electrode comprises an active material and one or more fibers. Each of the one or more fibers is being at least partially covered by a coating of nickel or copper, and the coating comprises a layer and a plurality of protrusions protruding from the layer, wherein the active material is attached at least on some of the protrusions.

In certain embodiments, each of the protrusions has a height in a range of 100 nm to 5 μm and a width in a range of 10 nm to 1 μm; and the layer of the coating of nickel has a thickness in a range of 1 μm to 5 μm and the layer of the coating of copper has a thickness in a range of 100 nm to 1 μm.

The details of one or more implementations of the present disclosure are set forth in the accompanying drawings and the following detailed description. Other features, structures, characteristics, and advantages of present disclosure will be apparent from the description and drawings, and from the claims.

BRIEF DESCRIPTION OF THE DRAWINGS

The appended drawings, where like reference numerals refer to identical or functionally similar elements, contain figures of certain embodiments to further illustrate and clarify various aspects, advantages and features of the present invention disclosed herein. It will be appreciated that these drawings depict only certain embodiments of the invention and are not intended to limit its scope. The electrode and the method disclosed herein will be described and explained with additional specificity and detail through the use of the accompanying drawings in which:

FIG. 19A depicts the charge and discharge profiles and rate capability of LTO on Cu foil.

FIG. 19B depicts the charge and discharge profiles and rate capability of LTO on carbon fabric.

Skilled artisans will appreciate that elements in the figures are illustrated for simplicity and clarity and have not necessarily been depicted to scale.

DETAILED DESCRIPTION OF THE INVENTION

The following detailed description is merely exemplary in nature and is not intended to limit the disclosure or its application and/or uses. It should be appreciated that a vast number of variations exist. The detailed description will enable those of ordinary skill in the art to implement an exemplary embodiment of the present disclosure without undue experimentation, and it is understood that various changes or modifications may be made in the function and method described in the exemplary embodiment without departing from the scope of the present disclosure as set forth in the appended claims.

The present disclosure relates to an electrode for a battery comprising a metallic fabric surface-coated by copper (Cu) or nickel (Ni) with a plurality of protrusions as current collector, such that an active material is attached to the protrusions of the metallic fabric.

The terminology used herein is for the purpose of describing particular embodiments only and is not intended to be limiting of the described technology. A "fabric" as used herein has a porous fiber network made by interlacing fibers, threads or yarns and containing pores. Each thread or yarn is a bundle of fibers and its size can be varied according to the number of fibers in the yarn, the diameter of each fiber and the packing density of fibers.

The use of the terms "a", "an", "the", "at least one", and similar referents in the context of describing the invention are to be construed to cover both the singular and the plural, unless otherwise indicated herein or clearly contradicted by context. The use of the term "about", "approximate", and "approximately" followed by a quantitative value is to be construed to refer to, e.g., a ±10% or ±5% variation from the quantitative value unless otherwise indicated or inferred. The use of any and all examples, or exemplary language (e.g., "such as") provided herein, is intended merely to better illuminate the invention and does not pose a limitation on the scope of the invention unless otherwise claimed.

Textiles have been well-known for their reliable wearability for thousands of years. It is apparent that the superior mechanical stability of textiles comes from the well-designed filament-yarn-fabric hierarchical structure. This stimulated the respective research as disclosed herein on the use of the unique textile structure for preparing current collectors for wearable LIBs.

Figure 1A:
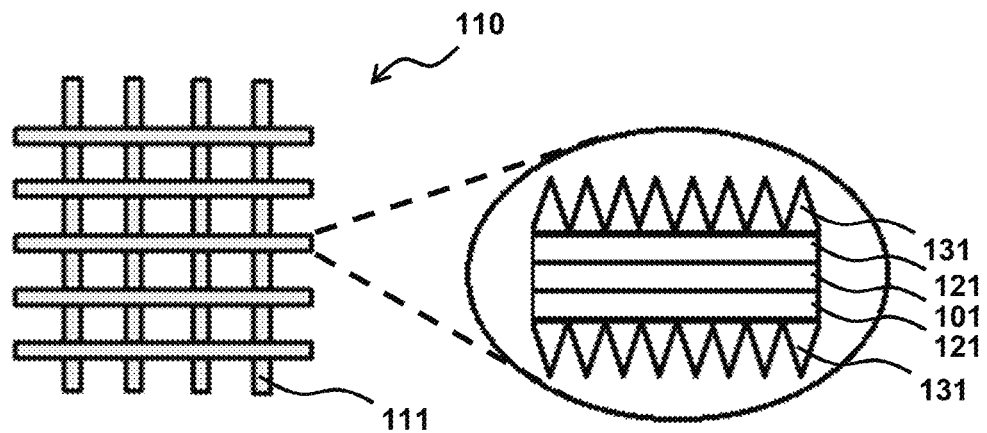
FIG. 1A depicts a schematic diagram showing a metallic fabric with Ni protrusions according to certain embodiments.
Figure 1B:
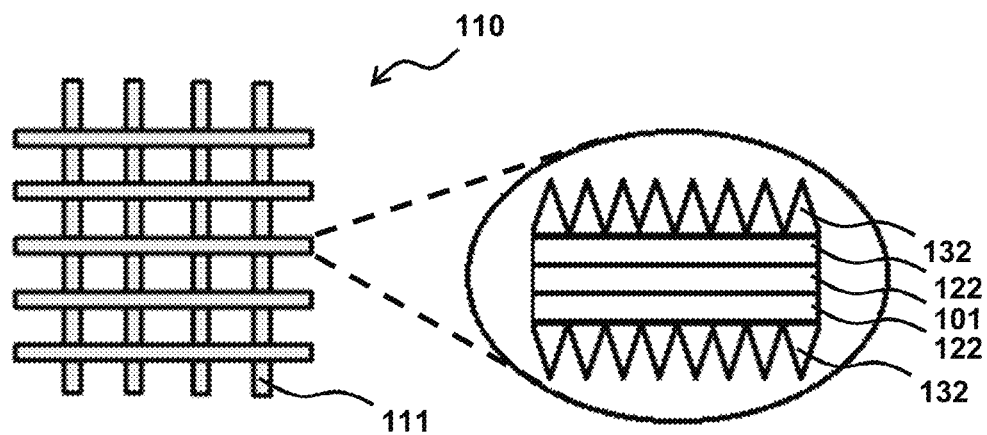
FIG. 1B depicts a schematic diagram showing a metallic fabric with Cu protrusions according to certain embodiments.

As shown in FIG. 1, a metallic fabric 110 with nano-scale protrusions in accordance with the present disclosure is provided. The metallic fabric 110 is formed from one or more metallic fibers 111 interlaced to each other to obtain a porous fiber network. The one or more metallic fibers 111 being at least partially covered by a coating of nickel (Ni) or copper (Cu). As depicted in FIG. 1A, the nickel coating on a fiber 101 comprises a nickel layer 121 and a plurality of nickel protrusions 131 protruding from the nickel layer 121. Now referring to FIG. 1B, the copper coating on fiber 101 comprises a copper layer 122 and a plurality of copper protrusions 132 protruding from the copper layer 122. The active materials 141, 142 are attached at least on some of the protrusions 131, 132. In certain embodiments, the active material is sulfur, silicon, lithium metal, lithium titanate, lithium iron phosphate, lithium cobalt oxide or lithium manganite. Advantageously, the protrusions 131, 132 can effectively increase the surface area of the metal coating for attaching to the active material to obtain an electrode for a battery.

Figure 2:
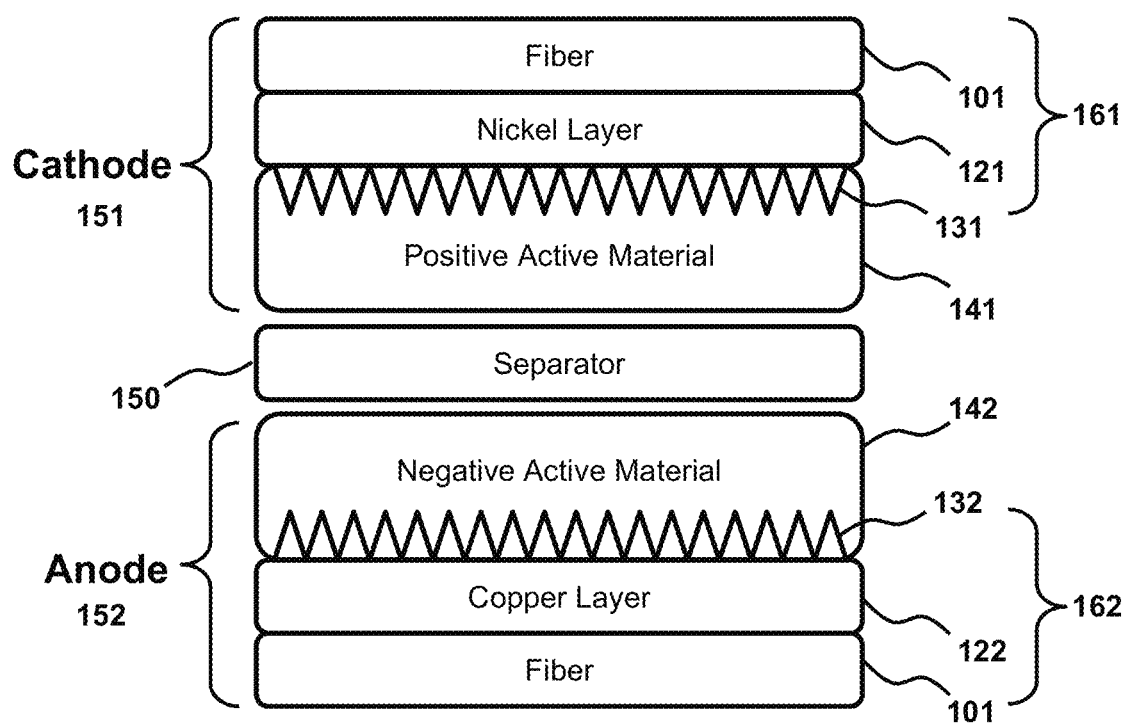
FIG. 2 depicts the structure of a lithium ion battery comprising metallic fabrics of FIGS. 1A and 1B as current collectors according to certain embodiments.

FIG. 2 is the structure of an exemplary LIB that incorporates the teachings of the present disclosure, comprising a cathode (positive electrode) 151, an anode (negative electrode) 152 and a separator 150. Each of the cathode 151 and the anode 152 further comprises the metallic fabric 110 of FIG. 1A and FIG. 1B as current collector 161, 162 and an active material 141, 142 disposed thereon. The active material in the anode (negative active material) 142 attached to the negative current collector 162 releases lithium ions when discharging, and absorbs lithium ions when the battery is being charged. On the other hand, the cathode 151 contains a substance capable of reacting chemically with lithium ions, such as transition to metal oxides. The active material in the cathode (positive active material) 141 attached to the positive current collector 161 reacts with lithium ions in the discharging step of the battery, and releases lithium ions in the charging step of the battery. The separator 150 of a LIB is used to separate the cathode 151 and the anode 152.

Both nickel and copper are typical low-cost transition metals with high electrical conductivity and good electrochemical inertness in organic electrolytes, making them highly suitable for the use in LIBs as current collectors 161, 162. The present disclosure provides a method of depositing nickel and copper respectively onto the surface of commercial fibers or fabrics using chemical and electrochemical processes to obtain metallic fabrics 110 as the current collectors 161, 162. The commercial fiber or fabric may include a cotton, a polyester, a nylon, a polyurethane, or other materials produced from natural fibers or man-made fibers and combinations thereof. The metallic fabrics 110 with nickel protrusions 131 or copper protrusions 132 enhance the electrochemical energy storage performance by increasing the contact area between the current collector 161, and the active materials 141, 142 and shortening the charge carrier transport paths, making the metallic fabrics 110 more suitable for wearable LIBs. Furthermore, the rough surface of the metallic fabrics 110 can improve the mechanical stability of the electrodes 151, 152 by increasing the interfacial adhesion between the metallic fabrics 110 and the active materials 141, 142. The resultant wearable LIBs constructed from these metallic fabrics 110 exhibited considerable energy density of 21 Wh/L at high power density of 439 W/L and superior electrochemical stability under various mechanical effects, such as folding, twisting, squeezing, and impacting, which is particularly preferred for portable and wearable electronic devices.

In order to convert an insulating cotton fabric into an electrically conducting medium, metal is deposited onto the surface through the wet-chemistry strategy. Nickel and copper are selected as the metals for the cathode 151 and the anode 152 of wearable LIBs respectively. In view of the ease preparing the metallic fibers and fabrics provided herein, the present disclosure provides a scalable approach to fabricate nanostructured nickel and copper coated cotton fabrics to obtain nickel-coated cotton fabrics (such as NiCotton) and copper-coated cotton fabrics (such as CuCotton).

Figure 3:
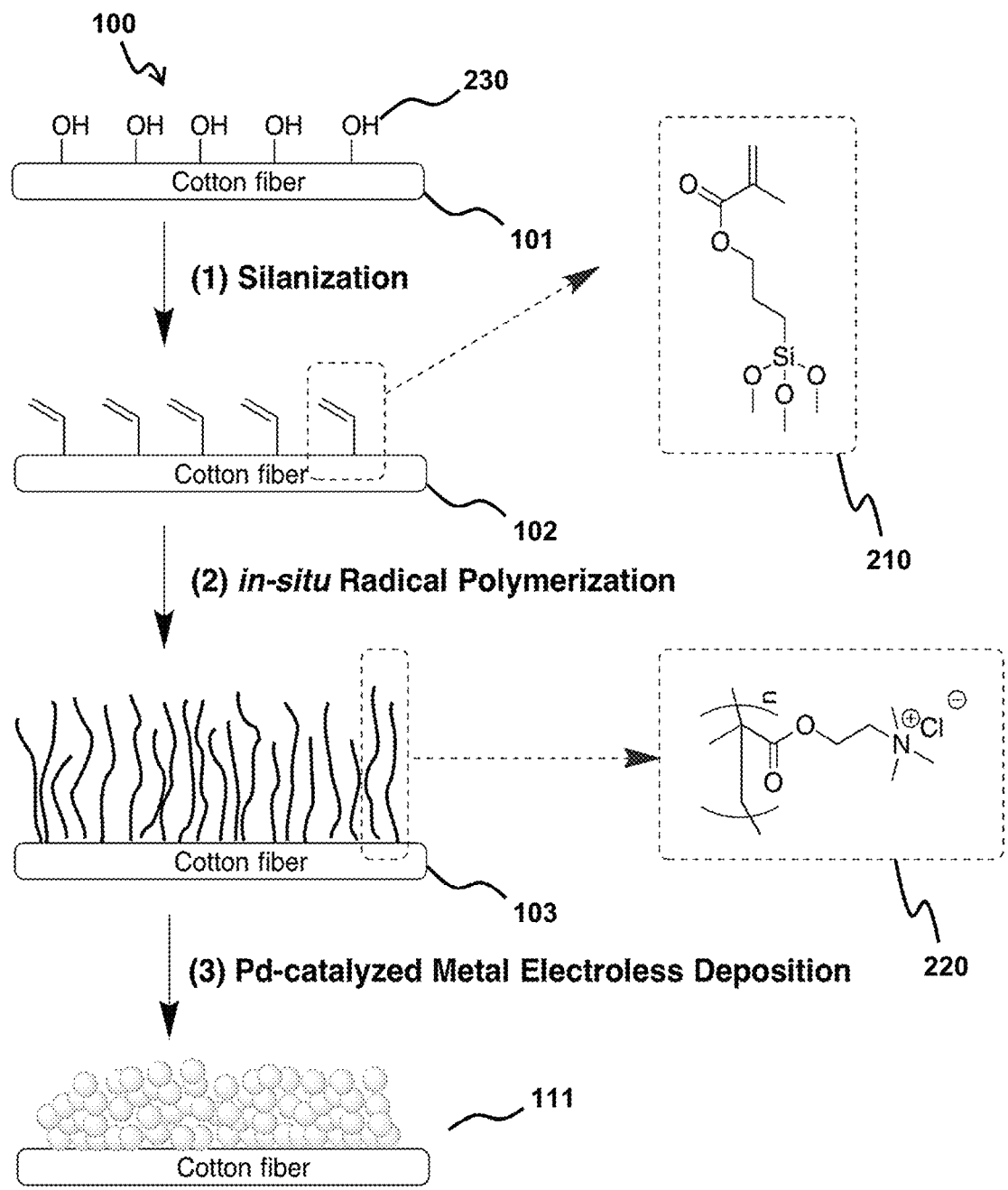
FIG. 3 depicts the synthetic protocol for pretreating cotton fibers prior to metal deposition on the fibers through polymer brush assisted electroless deposition according to certain embodiments.

FIG. 3 depicts an overview of an exemplary synthetic protocol for preparing the metallic fabrics 110 employing a polymer brush assisted electroless deposition (ELD). Cotton fabric 100 comprising one or more fibers 101 is used to prepare the metallic fabric 110 comprising one or more metallic fibers 111. The high density of hydroxyl groups 230 on cotton cellulose fibers enables the efficient grafting of polyelectrolyte brushes. According to certain embodiments, the metallic fabrics 110 with areal density of ~110 g/m$^2$ are cut into pieces with the size of 15×10 cm$^2$ and thoroughly clean by deionized water washing. The cotton fabrics 100 are first immersed into a mixture of ethanol, acetic acid, and deionized water (95/1/4, v/v/v). After adding 1 mL of 3-(trimethoxysilyl)propyl methacrylate 210, the mixture is placed still at room temperature for 60 minutes for silanization to form silane-modified fibers 102. Subsequently, the silane-modified cotton fabrics 102 are immersed into a 10% (v/v) aqueous solution of 2-methacryloyloxyethyl trimethylammonium chloride (METAC) to prepare the polyelectrolyte brush 220 through in-situ radical polymerization. The polymerization can be carried out at 80° C. for 60 minutes using potassium persulfate as the initiator to obtain the polymer brush-modified fibers 103. Then, the polymer brush-modified fibers 103 are immersed into a 5 mL aqueous solution of $(NH_4)_2PdCl_4$ for 30 min to immobilize $Pd^{2+}$ through ion exchange. Finally, the resulting fabrics are immersed into ELD bath at room temperature for different time intervals to deposit nickel or copper on top of cotton fibers 101.

For depositing nickel, the ELD bath contains $Ni_2SO_4$ (40 g/L), sodium citrate (20 g/L), lactic acid (10 g/L), and dimethylamine borane (DMAB) (1 g/L). In certain embodiments, the concentration of nickel can be in a range of 15 g/L to 30 g/L. The pH of the ELD bath is adjusted to ~8.0 with ammonia prior to deposition. By performing ELD for 30 minutes to 2 hours, a thickness of 1 µm to 5 µm nickel layer can be formed on the cotton fibers 101. ELD can be used to deposit nickel metal to form a relatively flat nickel layer 121 on top of the cotton fibers 101. The present method further utilizes the step of nickel electrodeposition after ELD to form a plurality of nickel protrusions 131 protruding from the nickel layer 121. To prepare the nanostructured nickel, the Ni-coated cotton fabrics after ELD are washed and immediately immersed into an electrodeposition bath consisting of $NiCl_2$ (240 g/L), boronic acid (30 g/L), and ethylenediamine (90 g/L). In certain embodiments, the concentration of nickel can be in a range of 80 g/L to 130 g/L. The pH was adjusted to ~4.0 with HCl solution before deposition. The electrodeposition was carried out at a temperature of 60° C. by using the Ni-coated cotton fabrics as the work electrode and Ni foil as the counter electrode under a constant current density of 50 mA/cm$^2$. Nickel protrusions 131 in the range of several hundred nanometers can be formed. The presence of coordination agent, e.g., ethylenediamine can further facilitate the growth of the nickel protrusions. In certain embodiments, the electrodeposition comprises an electrodeposition bath comprising nickel with a concentration in a range of 80 g/L to 130 g/L and ethylenediamine with a concentration in a range of 70 g/L to 110 g/L, an electrodeposition time in a range of 2 min to 30 min, a current density in a range of 40 mA/cm$^2$ to 60 mA/cm$^2$, and an electrodeposition temperature in a range of 50° C. to 90° C. In certain embodiments, the height and width of the nickel protrusions 131 are in a range of 100 nm to 5 µm and in a range of 10 nm to 1 µm respectively.

For depositing copper, the ELD bath includes a mixture of $CuSO_4 \cdot 5H_2O$ (6.5 g/L), potassium sodium tartrate (14.5 g/L), NaOH (6 g/L), and formaldehyde (9.5 mL/L). In certain embodiments, the concentration of copper can be in a range of 1.0 g/L to 2.0 g/L. Copper coated cotton fabrics with copper protrusions 132 can be obtained by controlling the ELD time. By performing ELD for 2 hours to 6 hours at a pH in a range of 12 to 14, the copper coating with copper protrusions 132 can be formed on the cotton fibers 101. It is apparent that the foregoing experimental conditions may vary according to the concentration, pH, temperature, and the height or shape of the protrusions formed. In certain embodiments, the thickness of the copper layers is in a range of 100 nm to 1 µm, and the height and width of the copper protrusions 132 are in a range of 100 nm to 5 µm and in a range of 10 nm to 1 µm respectively.

Figure 4:
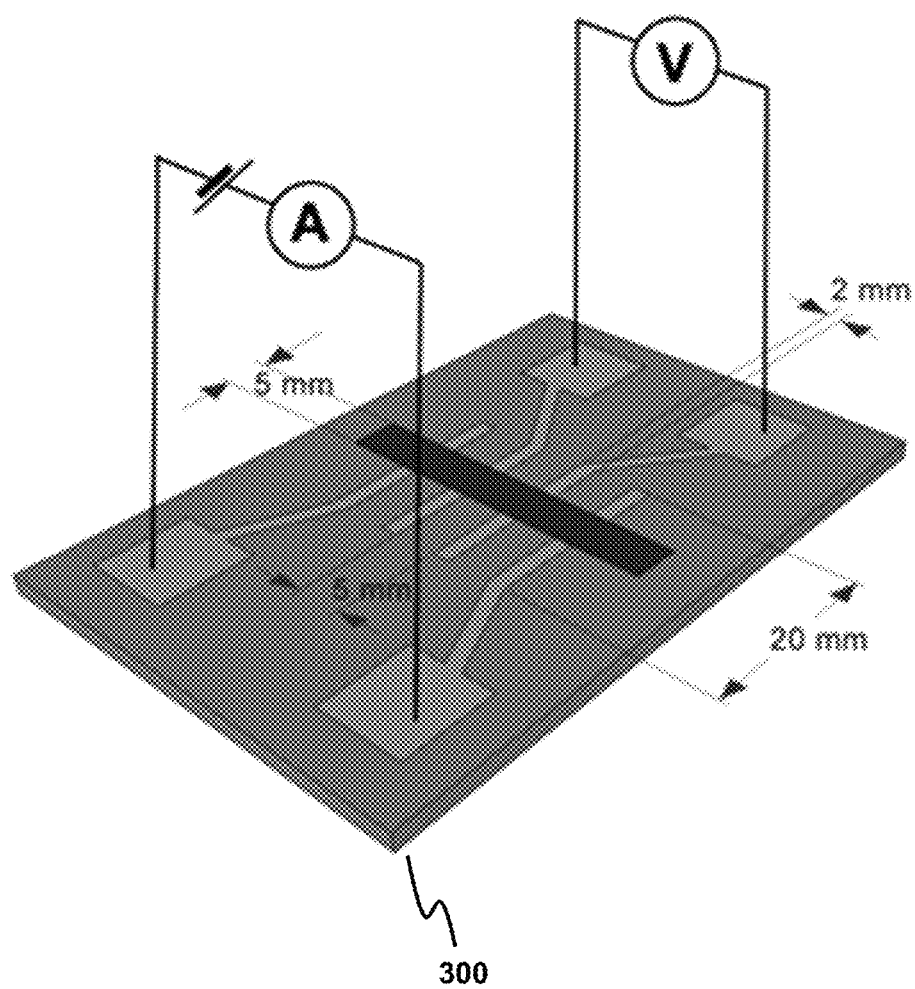
FIG. 4 depicts a 4-probe clamp for measuring the sheet resistance of a metallic fabric.
Figure 5A:
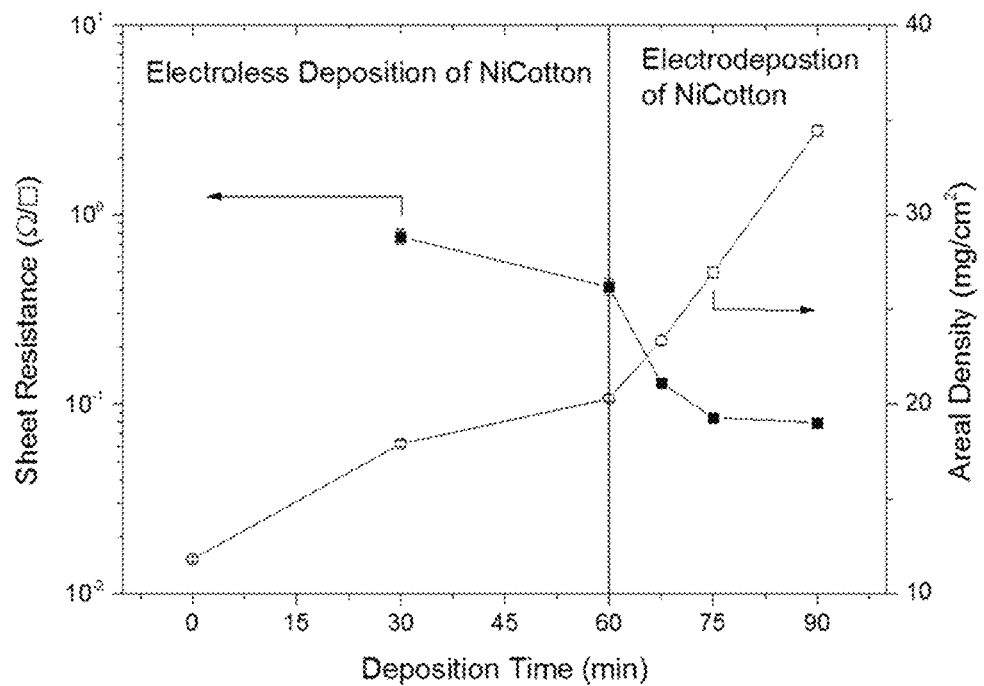
FIG. 5A depicts a graph showing the sheet resistance and areal density of the n-NiCotton.
Figure 5B:
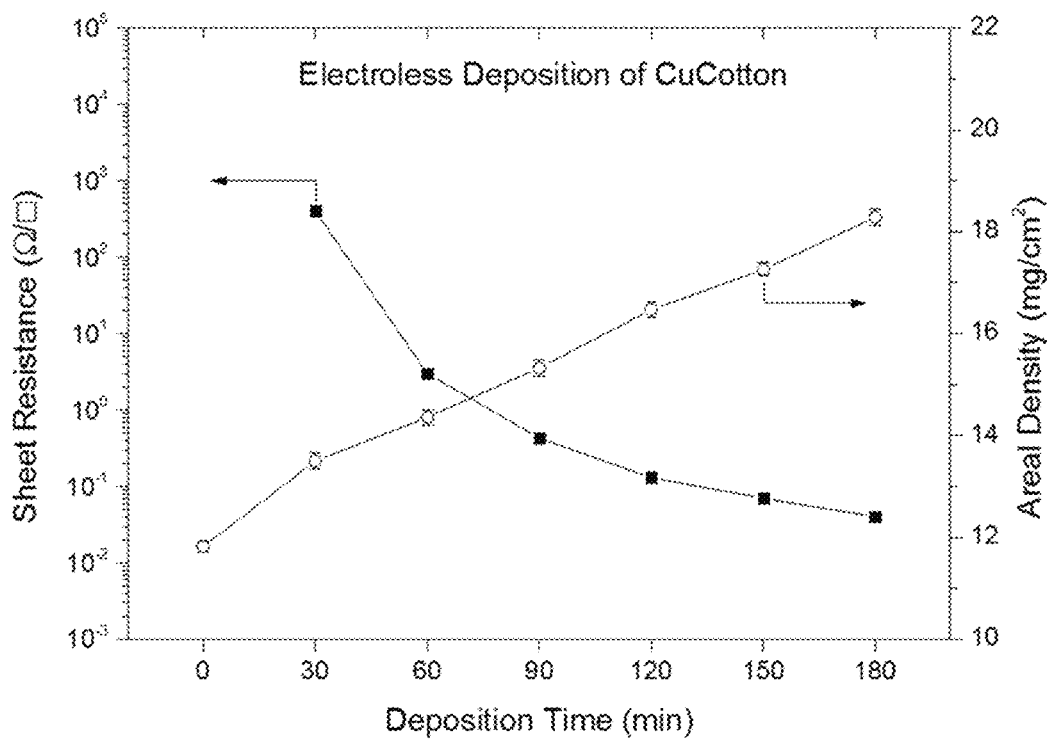
FIG. 5B depicts a graph showing the sheet resistance and areal density of the n-CuCotton.

FIG. 4 is a 4-probe clamp 300 for measuring the sheet resistance of a metallic fabric 110. The 4-probe clamp 300 is connected to a source meter (Keithley 2400). Over a varying deposition time, the sheet resistance and areal density of NiCotton fabrics and CuCotton fabrics are measured in FIG. 5A and FIG. 5B respectively. With a higher deposition time, the areal density can be increased while the sheet resistance can be decreased. In particular, the impact on the sheet resistance is significant for performing electrodeposition of NiCotton for obtaining a plurality of nickel protrusions 131 protruding from the nickel layer 121. In both cases, the sheet resistance of resultant metallic fabrics 110 can be decreased to a value lower than $10^{-1}$ Ω/square (Ω/□).

Figure 6A:
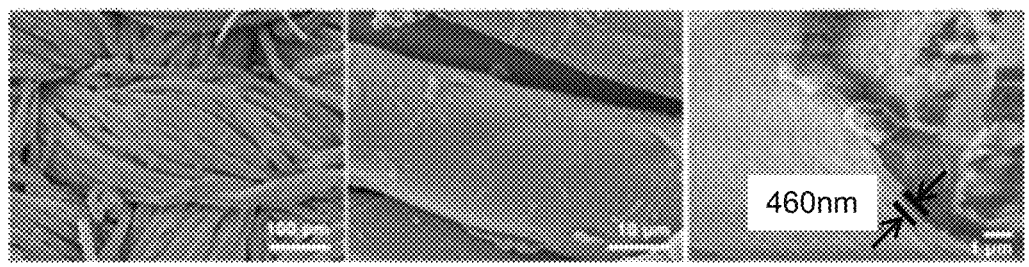
FIG. 6A depicts a group of scanning electron microscopy (SEM) images showing the morphology evolution of Ni on cotton fabrics, after 60 minutes of electroless deposition (ELD).
Figure 6B:
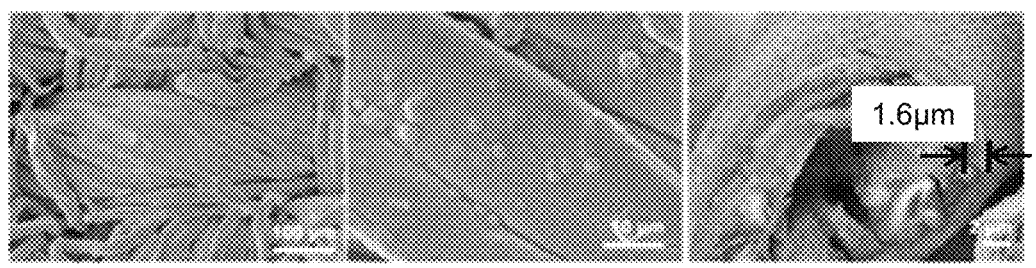
FIG. 6B depicts a group of SEM images showing the morphology evolution of Ni on cotton fabrics, after 68 minutes of ELD.
Figure 6C:
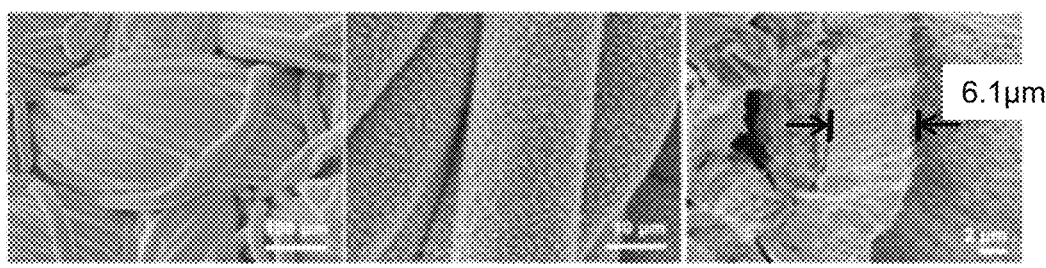
FIG. 6C depicts a group of SEM images showing the morphology evolution of Ni on cotton fabrics, after 90 minutes of ELD.
Figure 6D:
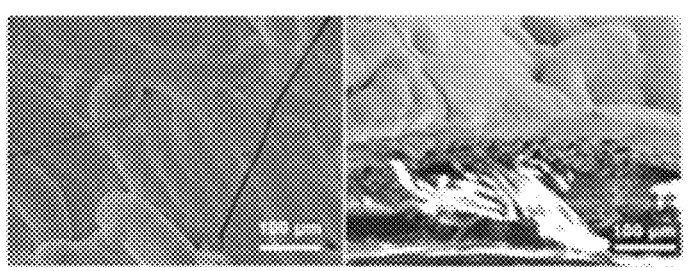
FIG. 6D depicts a group of SEM images showing the morphology evolution of Ni on cotton fabrics, after 120 minutes of ELD.
Figure 7:
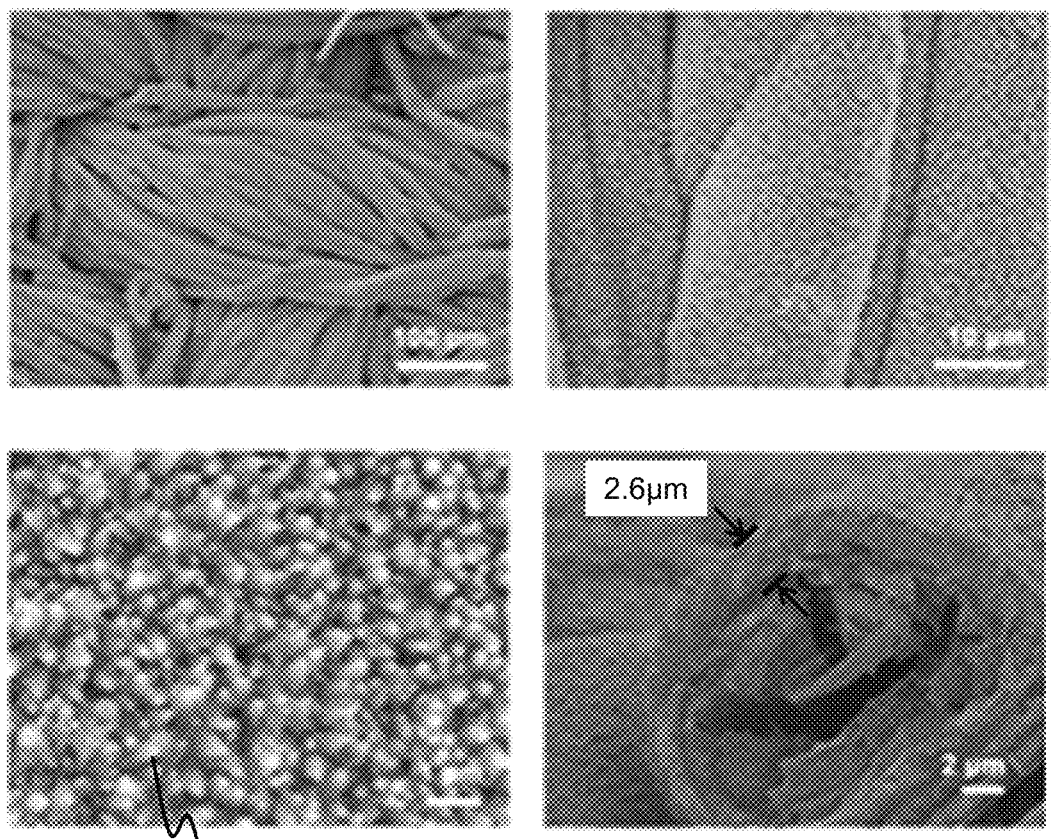
FIG. 7 depicts a group of SEM images showing the preparation of n-NiCotton through 75 minutes of Ni deposition, including 60 minutes of electroless deposition and 15 minutes of electrodeposition.

FIGS. 6A-6D and FIG. 7 are groups of scanning electron microscopy (SEM) images showing the morphology evolution of nickel on cotton fabrics 100 with different duration of ELD. All SEM images throughout the present disclosure were obtained by a Tescan VEGA3. After 60 min of ELD, nickel layer with the thickness of 460 nm is uniformly formed wrapping the cotton fibers 100, wherein the nickel layer 121 is formed by the close packing of nickel nanoparticles with an average diameter of ca. 100 nm and exhibited a relatively flat layer. This type of NiCotton fabric with the sheet resistance of 0.42Ω/□ is denoted as "f-NiCotton". By performing electrodeposition, nickel protrusions 131 can be grown from the surface of f-NiCotton. FIGS. 6B-6D provide the NiCotton fabrics after performing 8 minutes, 30 minutes, and 60 minutes of Ni electrodeposition based on the f-NiCotton. Therefore the total deposition time of the NiCotton in the three groups of SEM images are 68 minutes, 90 minutes, and 120 minutes respectively. The morphology and the thickness of the nickel protrusions 131 are greatly influenced by the deposition time. When the plating time is too long, such as 60 minutes as provided in FIG. 6D, the Ni layer induced may reach several tens of micrometers and overlap the textile structure. The preferred condition is an electrodeposition of nickel for 15 minutes, as demonstrated in FIG. 7, which can provide uniform nickel protrusions 131 with the roots of several hundreds of nanometers. The total thickness of Ni coating layer is estimated to be 2.6 µm. This type of NiCotton fabric with the sheet resistance of 0.085Ω/□ is denoted as "n-NiCotton".

Figure 8A:
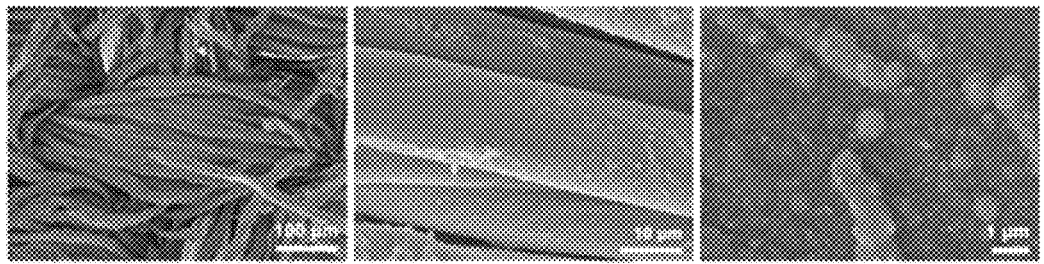
FIG. 8A depicts a group of SEM images showing the morphology evolution of Cu on cotton fabrics, after 90 minutes of ELD.
Figure 8B:
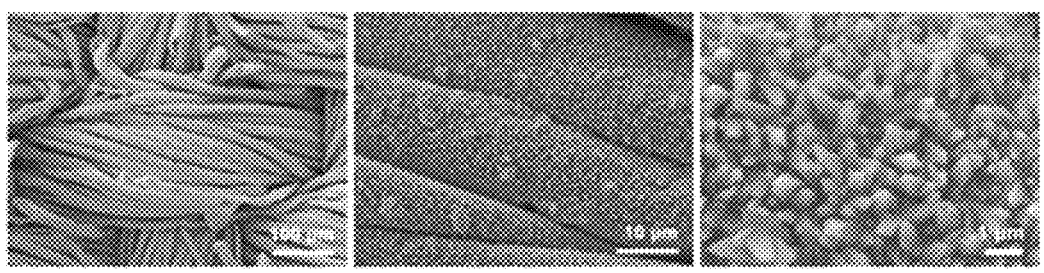
FIG. 8B depicts a group of SEM images showing the morphology evolution of Cu on cotton fabrics, after 120 minutes of ELD.
Figure 8C:
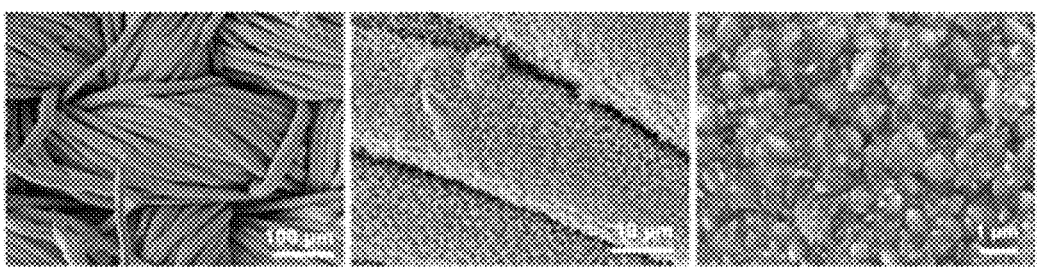
FIG. 8C depicts a group of SEM images showing the morphology evolution of Cu on cotton fabrics, after 180 minutes of ELD.
Figure 9:
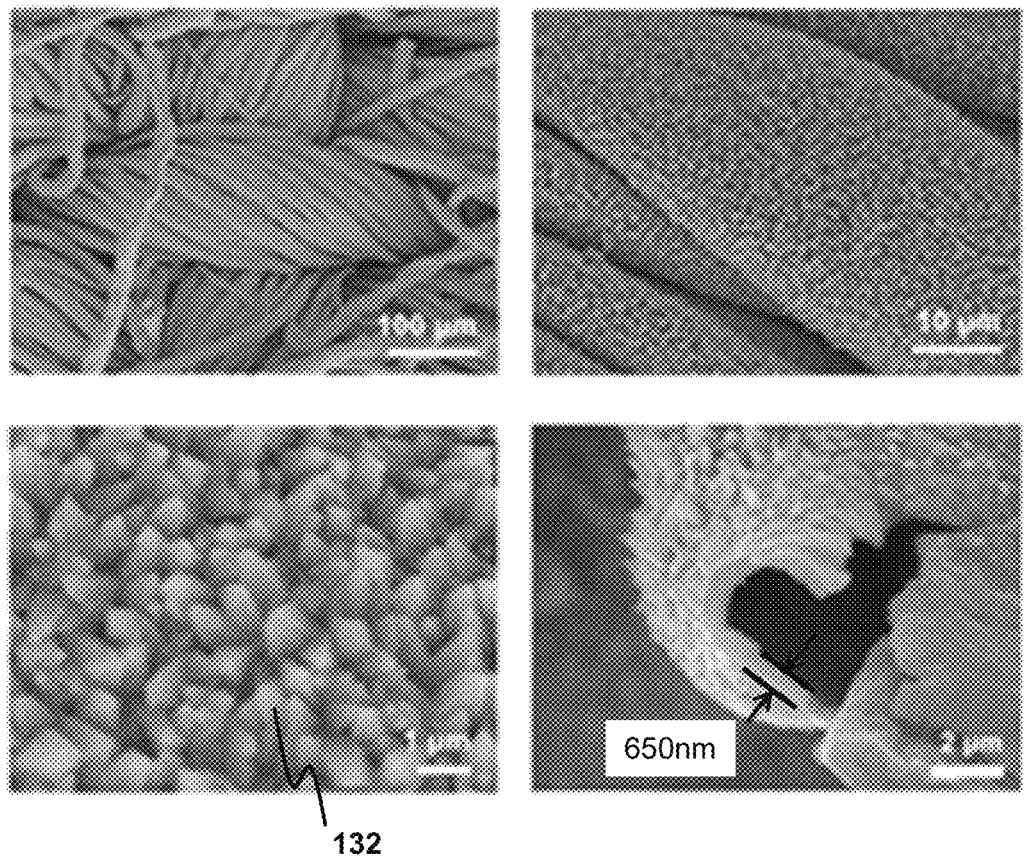
FIG. 9 depicts a group of SEM images showing the preparation of n-CuCotton through 150 minutes of Cu deposition.

FIGS. 8A-8C and FIG. 9 are groups of SEM images showing the morphology evolution of copper on cotton fabrics 100 with different duration of ELD. After 90 min of ELD, a relatively flat copper layer without protrusions is obtained. Some Cu reliefs of several tens nanometers can be clearly observed, which act as nucleation sites for the further growth of Cu protrusions. This type of CuCotton fabric with the sheet resistance of 0.43Ω/□ is denoted as "f-CuCotton". By increasing the time of ELD, Cu protrusions 132 are formed, which can be confirmed by the SEM images. FIGS. 8B and 8C provide the CuCotton fabrics after performing a total of 120 minutes and 180 minutes of ELD respectively. A prolonged deposition, such as 180 minutes of ELD, results in subtler Cu structures grown from the surface of copper protrusions 132. The preferred condition is an ELD of copper for 150 minutes, as demonstrated in FIG. 9, which can provide uniform copper protrusions 132 up to several hundred nanometers evenly cover all the fiber surface. The total thickness of Cu coating layer is estimated to be 650 nm. This type of CuCotton fabric with the sheet resistance of 0.07Ω/□ is denoted as "n-CuCotton".

Figure 10A:
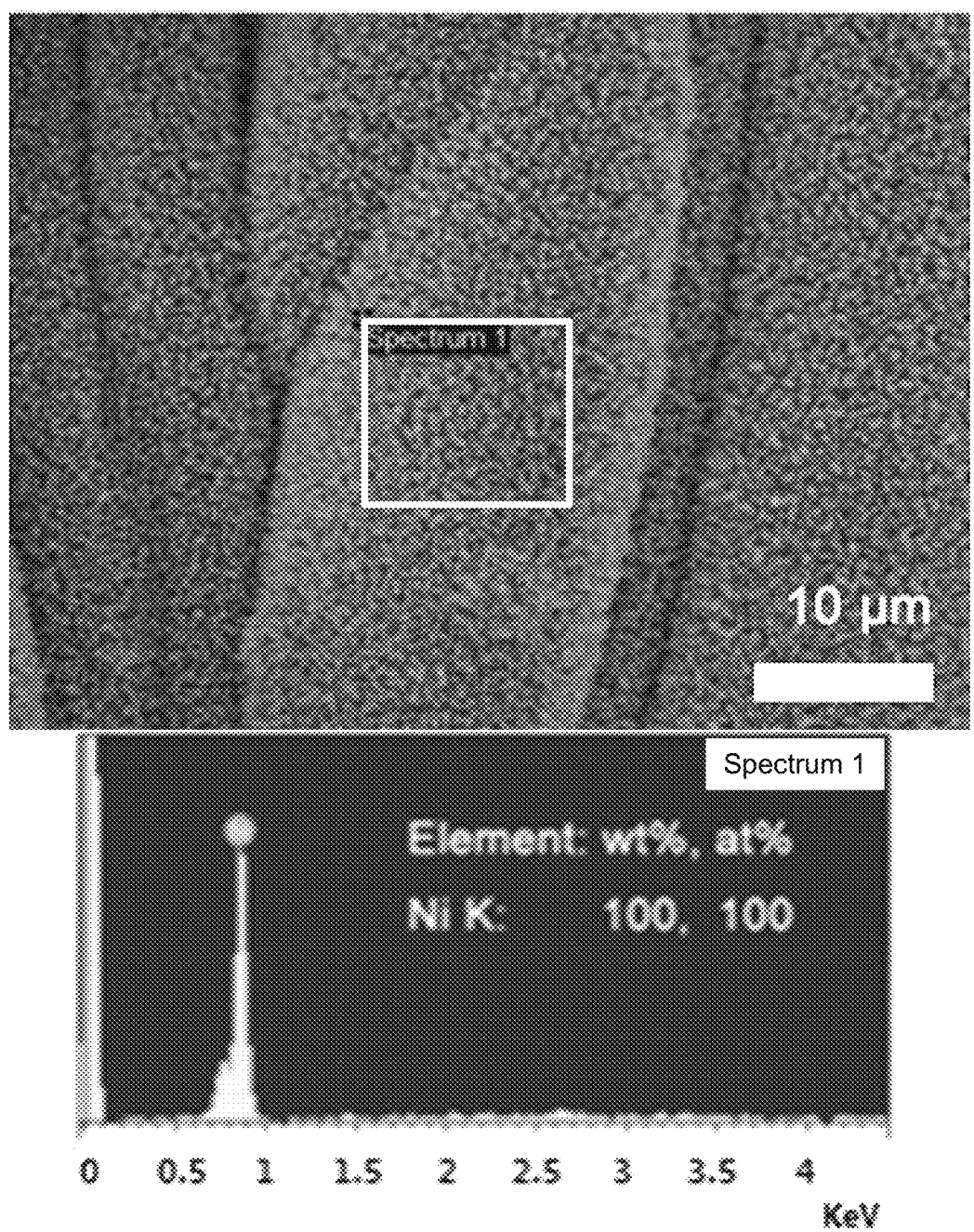
FIG. 10A depicts the energy-dispersive X-ray spectroscopy (EDX) result for the surface metal content of n-NiCotton.
Figure 10B:
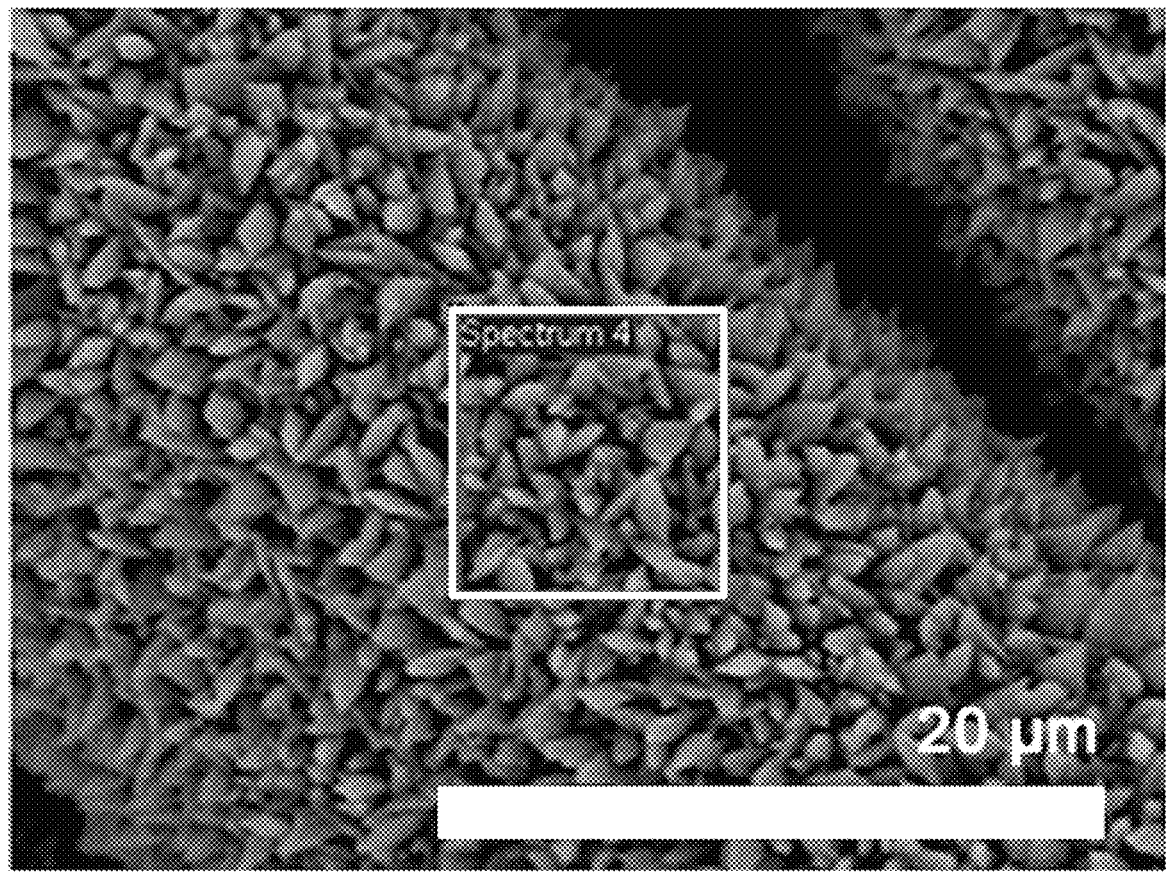
FIG. 10B depicts the energy-dispersive X-ray spectroscopy (EDX) result for the surface metal content of n-CuCotton.
Figure 10B:
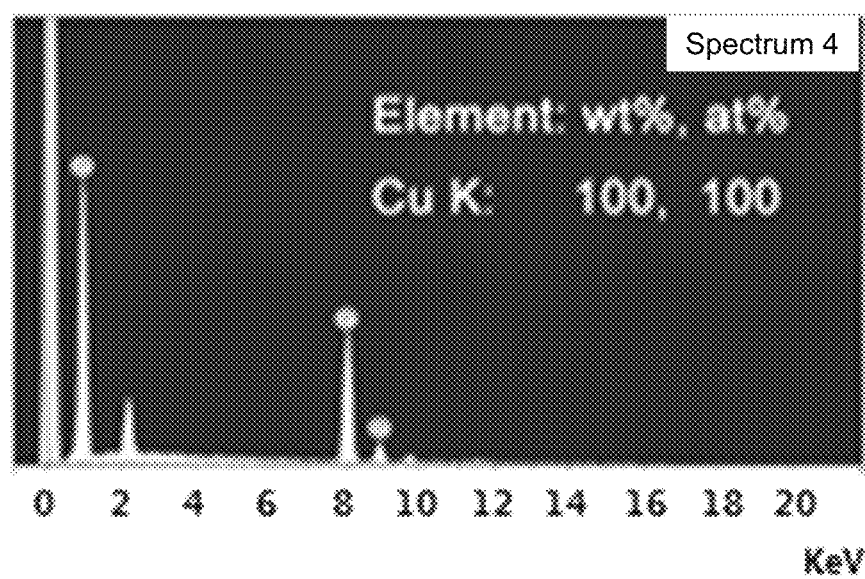
Figure 11:
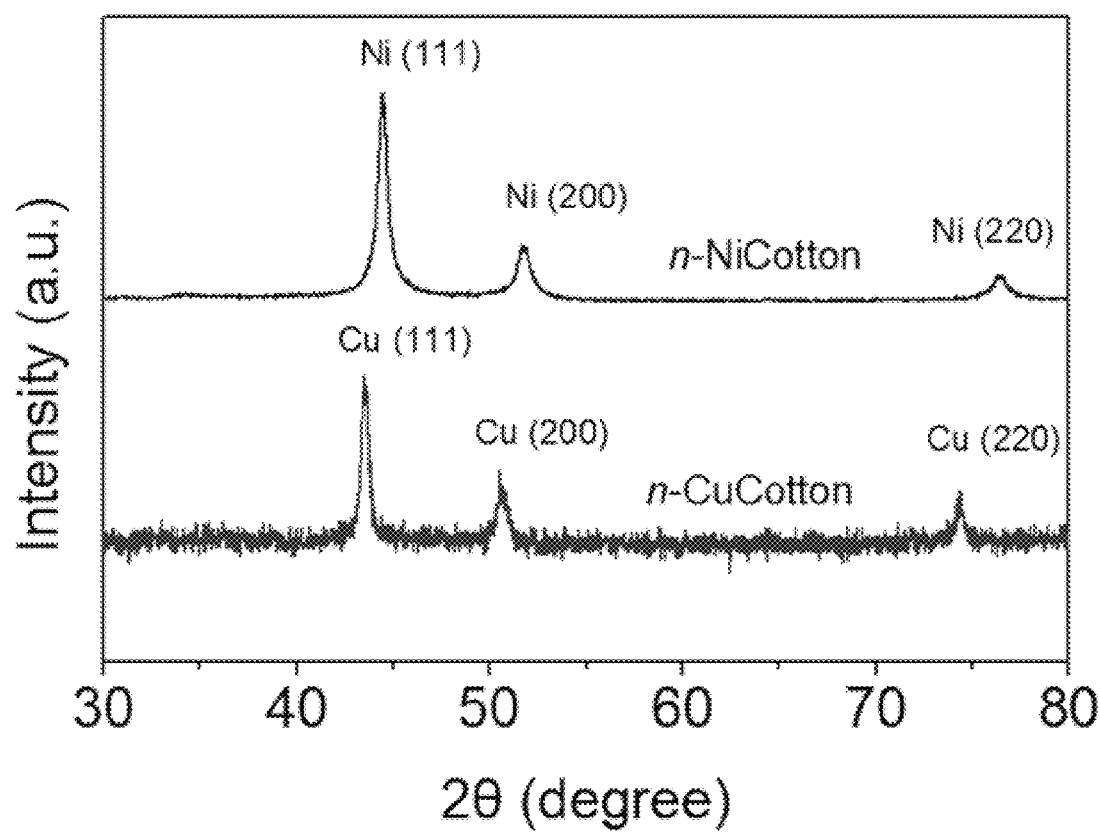
FIG. 11 depicts the X-ray diffraction (XRD) pattern of n-NiCotton and n-CuCotton.

The surface element content and the crystalline structure of n-NiCotton and n-CuCotton can further be verified by using energy-dispersive X-ray spectroscopy (EDX) and X-ray diffraction (XRD). The EDX images were obtained by a Tescan VEGA3 and the XRD curves were captured by using a Rigaku SmartLab diffractometer. FIGS. 10A and 10B are the EDX result for the surface metal content of n-NiCotton and n-CuCotton respectively. The results reveal that the surface metal content for n-NiCotton and n-CuCotton reaches approximately 100%. FIG. 11 is the XRD pattern of n-NiCotton and n-CuCotton. Both metallic fabrics exhibit characteristic peaks corresponding to (111), (200), and (220) planes, indicating the nickel and copper coating on the cotton fibers 101 are in the face-centered cubic (fcc) structure. No diffraction peaks for any other phases or metal oxides are detected, revealing the high purity of nickel and copper in the resulting nickel protrusions 131 and copper protrusions 132.

Figure 12:
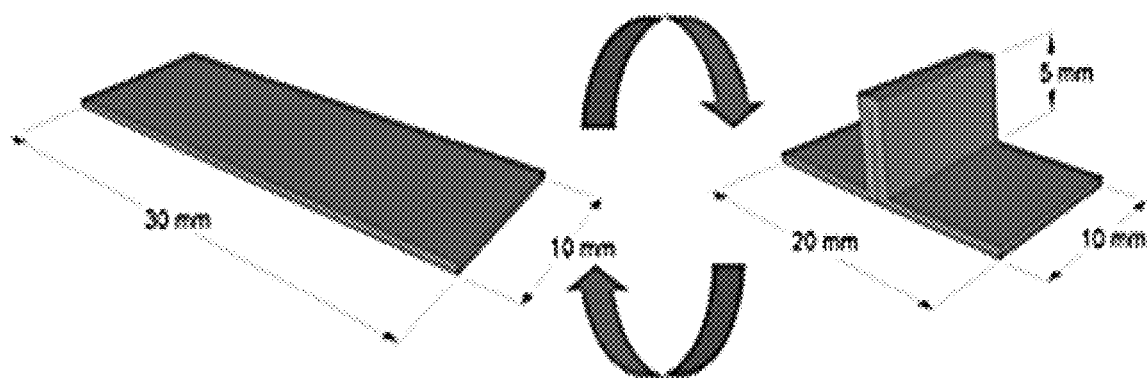
FIG. 12 depicts the standard for the folding test.
Figure 13A:
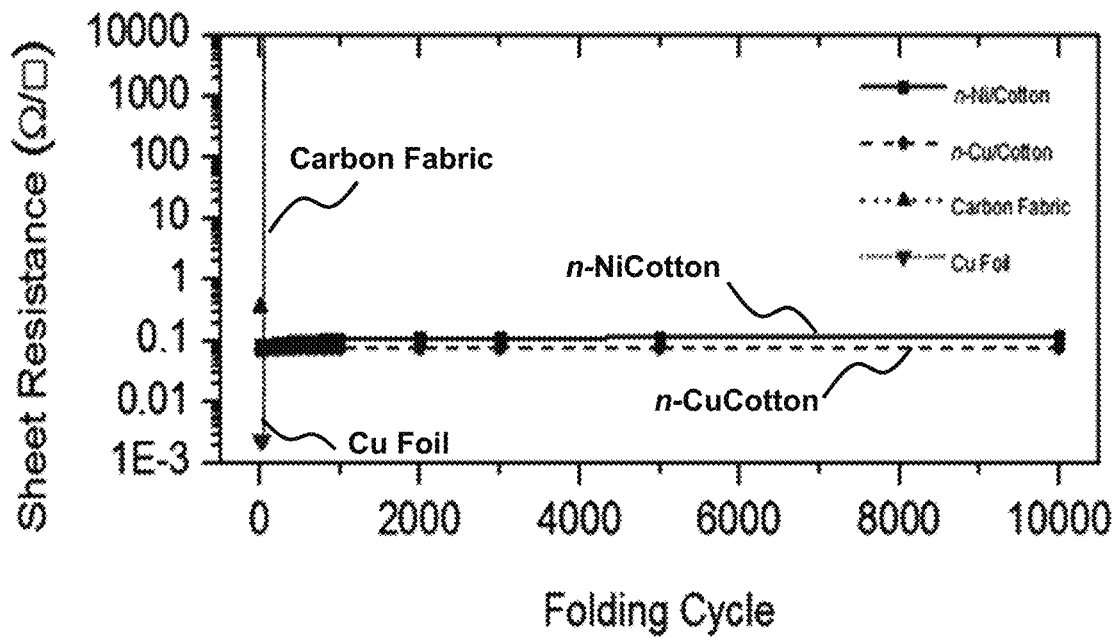
FIG. 13A depicts a graph showing the sheet resistance of carbon fabric, Cu foil, n-NiCotton, and n-CuCotton after performing the folding test.
Figure 13B:
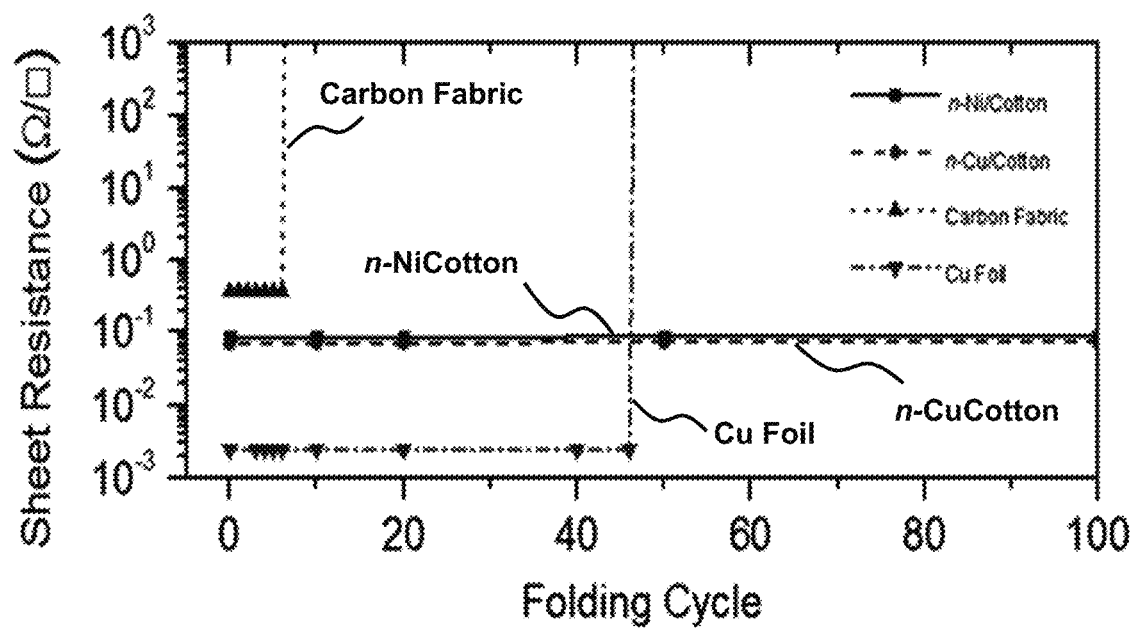
FIG. 13B depicts a close-up graph showing the sheet resistance of carbon fabric, Cu foil, n-NiCotton, and n-CuCotton after performing the folding test.

In contrast to commercial aluminum and copper foils, the n-NiCotton and n-CuCotton fabrics exhibit good mechanical stability, tolerating a wide range of mechanical deformations. In order to demonstrate the mechanical stability of the NiCotton and CuCotton fabrics, folding tests as shown in FIG. 12 are performed. The metallic fabric 110 with a size of 30×10 mm² is folded at the middle to form an inverted "T" shape with a height of 5 mm for up to $10^4$ times. This test can determine the mechanical stability by bending the test subject to 180° with a curvature radius of ca. 0.2 mm. The results of the folding test on carbon fabric, copper foil, n-NiCotton, and n-CuCotton test subjects are provided in FIGS. 13A and 13B. The sheet resistance of n-NiCotton increases from 0.085Ω/□ to 0.12Ω/□, and that of n-CuCotton increases from 0.07Ω/□ to 0.078Ω/□, after $10^4$ folding cycles. The sheet resistance values of n-NiCotton and n-CuCotton are 30 to 50 times higher than that of copper foil (2.4 mΩ/□), but are far less than the carbon fabric (0.36Ω/□). More importantly, the sheet resistance of the metallic fabrics 110 maintained a fairly low level of deterioration during folding, while copper foil and carbon fabric fractured and totally lost their conductivity after only 43 times and 9 times of folding respectively. The mechanical stability of the metallic fabrics 110, benefiting from the hollow structure of cotton fiber 101 and the interlocking interface between the deposited metal layer and the grafted polyelectrolyte brushes, is demonstrated.

After obtaining the metallic fabrics 110 with protrusions 131, 132 of nano-scale, the active materials are coated thereon to form the composite electrodes 151, 152 of the LIB. The positive active material 141 can be lithium iron phosphate (LiFePO$_4$) with the abbreviation "LFP". The negative active material 142 can be lithium titanate (Li$_4$Ti$_5$O$_{12}$) with the abbreviation "LTO". LFP and LTO, having been well investigated as active materials and widely utilized in fabricating high-power LIBs, are selected as model active materials for cathode 151 and anode 152 respectively. Other active materials may be used, e.g., lithium manganese oxide (LiMn$_2$O$_4$), lithium nickel manganese cobalt oxide (LiNi$_x$Mn$_y$Co$_z$O$_2$), lithium cobalt oxide (LiCoO$_2$), or lithium nickel cobalt aluminum oxide LiNiCoAlO$_2$). The electrodes using NiCotton and CuCotton as current collectors are prepared through the same approach as the commercial scalable preparation: slurry preparation, blade coating, drying, cutting, pressing, and weighting. Slurries consisting of LFP or LTO as active materials, carbon black, and polyvinylidene fluoride (PVDF) with weight ratio of 8:1:1 in N-methyl-2-pyrrolidone (NMP) are blade-coated onto the metallic fabrics 110 to obtain a cathode 151 or an anode 152 of the LIB respectively. Control electrodes are also prepared by coating the slurries onto (1) a carbon fabric with an areal density of 130 g/m², thickness of 250 µm, and sheet resistance of 0.36Ω/□; (2) an Al foil with a thickness of 16 µm; and (3) a copper foil with a thickness of 11 µm. The electrodes are then dried at 80° C., punched, compressed, and completely dried under vacuum at 110° C. The areal mass loading of the active materials 141, 142 was carefully controlled in the range of 7.0-8.0 mg/cm² by tuning the gap of blade coater. Electrodes using carbon fabric and metal foils (Al foil for LFP and Cu foil for LTO) are also prepared through the same procedures and tested as control samples.

Figure 14A:
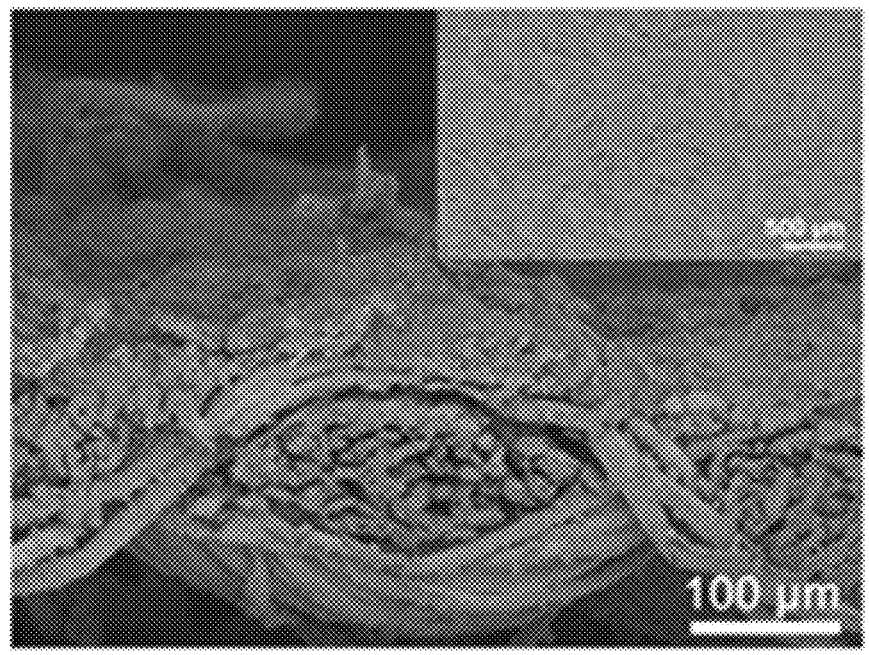
FIG. 14A depicts a cross-sectional SEM image of the lithium iron phosphate ($LiFePO_4$, LFP)/n-NiCotton electrode.
Figure 14B:
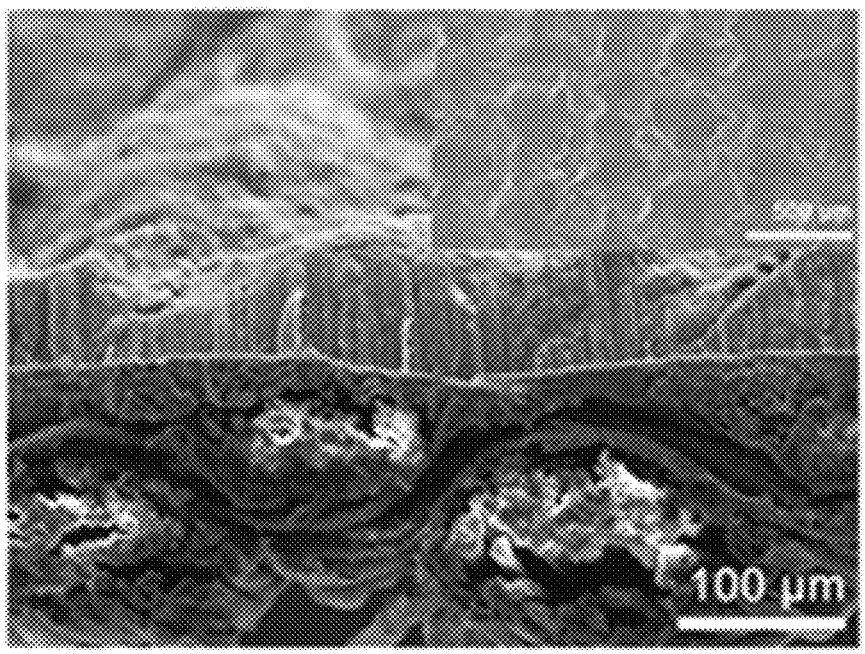
FIG. 14B depicts a cross-sectional SEM image of the lithium titanate ($Li_4Ti_5O_{12}$, LTO)/n-CuCotton electrode.

Referring to FIGS. 14A and 14B, cross-sectional SEM images of the LFP/n-NiCotton electrode and the LTO/n-CuCotton electrode are scrutinized. The active materials are evenly dispersed on the top surface of metallic fabrics 110 and smooth the three dimensional reliefs of the woven structure.

Figure 15A:
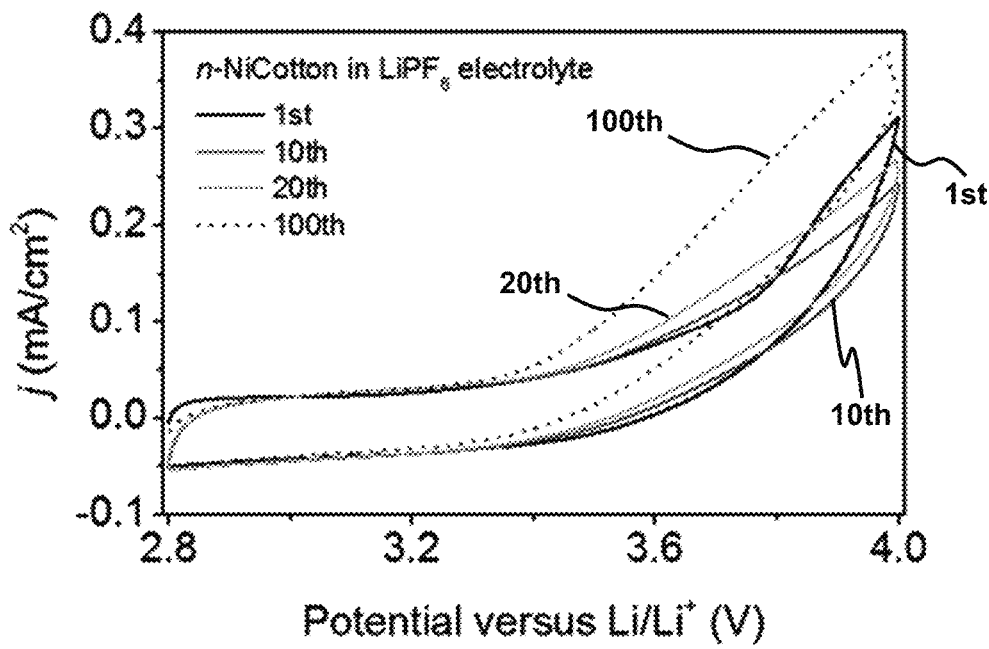
FIG. 15A depicts a cyclic voltammetry profile of n-NiCotton in 1 M lithium hexafluorophosphate ($LiPF_6$) solution.
Figure 15B:
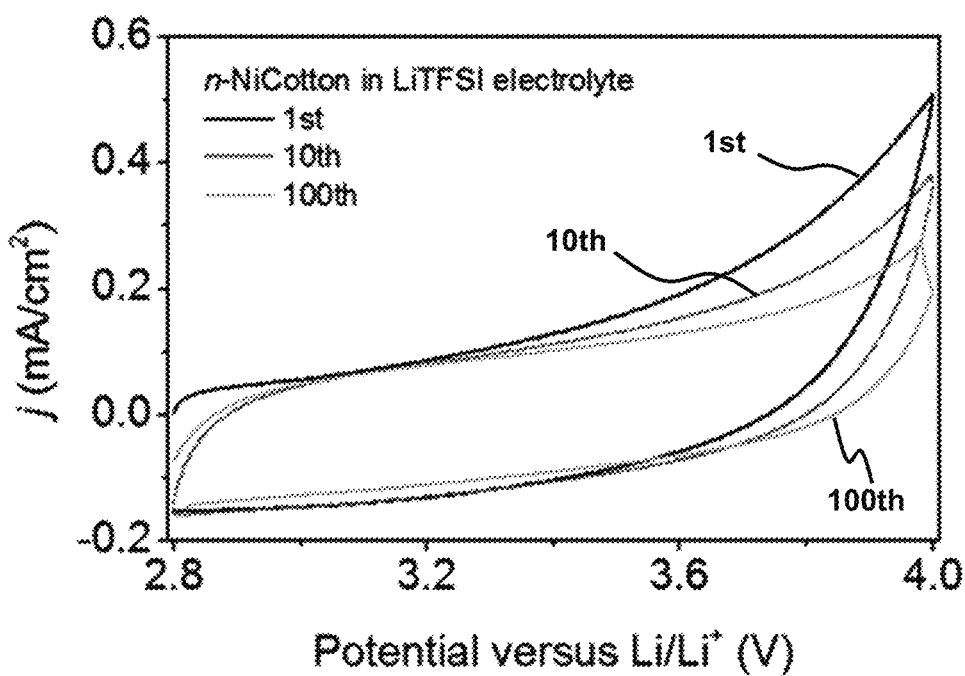
FIG. 15B depicts a cyclic voltammetry profile for n-NiCotton in 1 M lithium bis(trifluoromethanesulfonyl) imide (LiTFSI) solution.
Figure 16A:
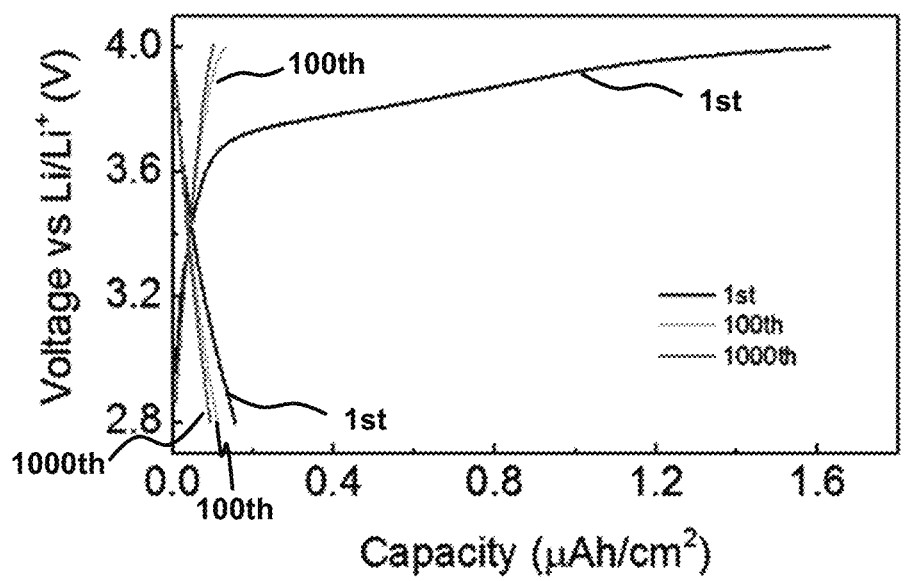
FIG. 16A depicts the charging and discharging voltage profiles of n-NiCotton/Li.
Figure 16B:
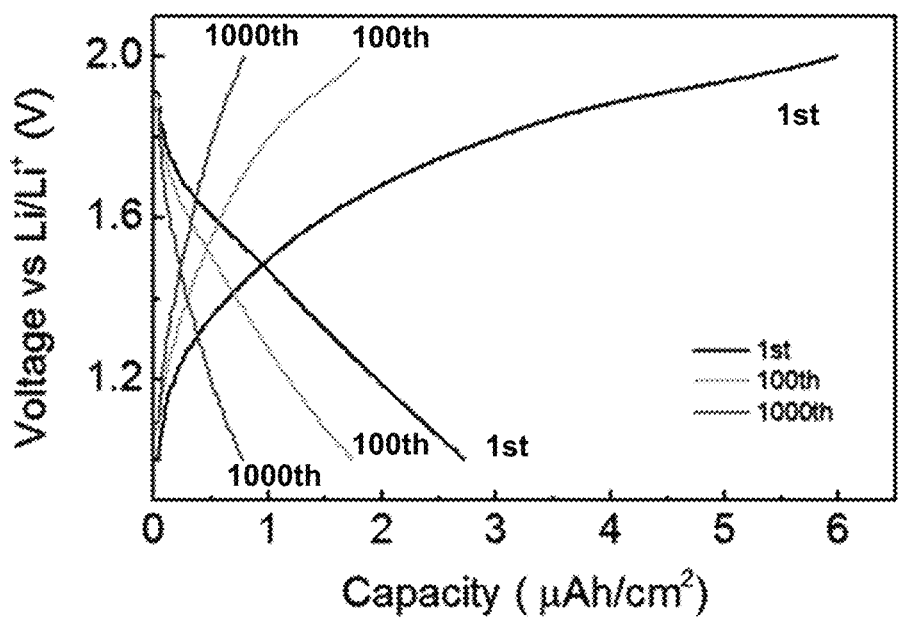
FIG. 16B depicts the charging and discharging voltage profiles of n-CuCotton/Li.

Before assembling the electrodes to form cells, the electrochemical stability of the NiCotton under high potentials was examined. FIG. 15A provides the cyclic voltammetry profile of n-NiCotton in 1 M lithium hexafluorophosphate (LiPF$_6$) solution. The results reveal that the polarized current is increased gradually at the high voltage side. As shown in FIG. 15B, the polarized current of n-NiCotton in 1 M lithium bis(trifluoromethanesulfonyl)imide (LiTFSI) solution is decreased as the cycling, suggesting that the electrochemical stability of the NiCotton in the LiTFSI solution is better. The voltage profiles of n-NiCotton and n-CuCotton under a constant charging/discharging current of 1 mA/cm$^2$ also prove that the chemically deposited nickel and copper are electrochemically stable in LiTFSI-based electrolyte solution for at least 1000 cycles, as demonstrated in FIG. 16A and FIG. 16B respectively. Thus the LiTFSI-based electrolyte is employed to prepare the half and full cells.

Figure 17A:
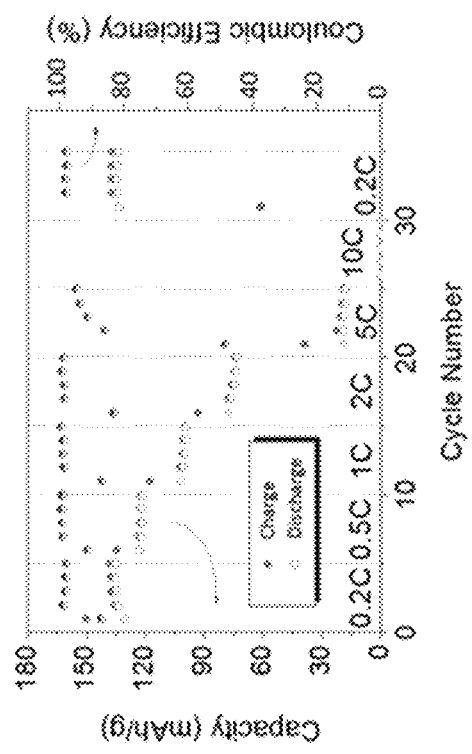
FIG. 17A depicts the charge and discharge profiles and rate capability of LFP on Al foil.
Figure 17A:
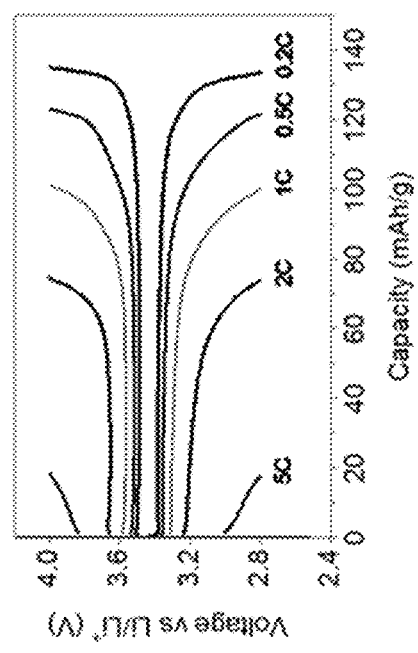
Figure 17B:
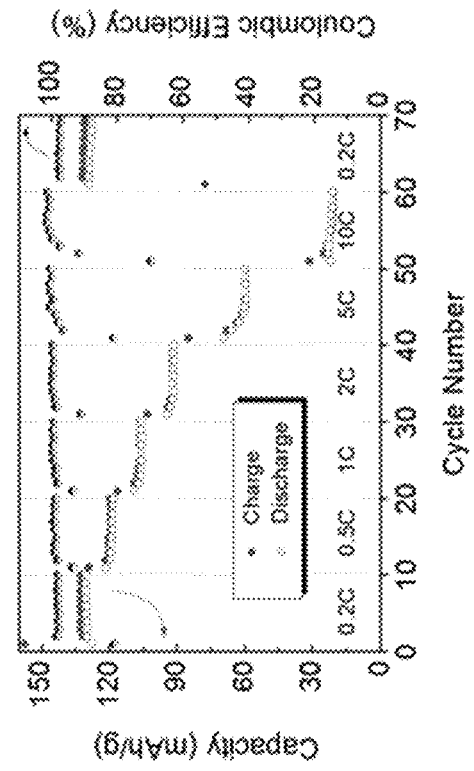
FIG. 17B depicts the charge and discharge profiles and rate capability of LFP on carbon fabric.
Figure 17B:
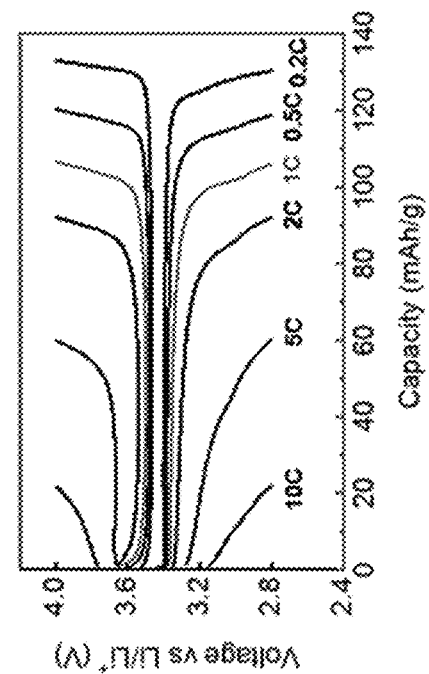
Figure 17C:
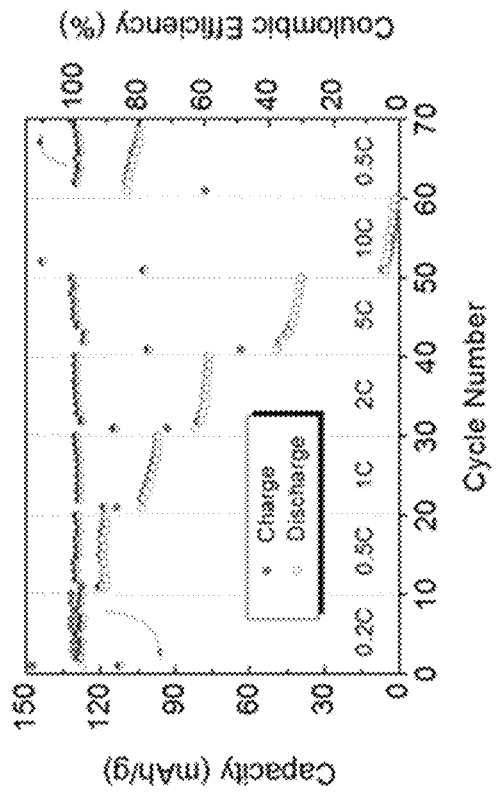
FIG. 17C depicts the charge and discharge profiles and rate capability of LFP on f-NiCotton.
Figure 17C:
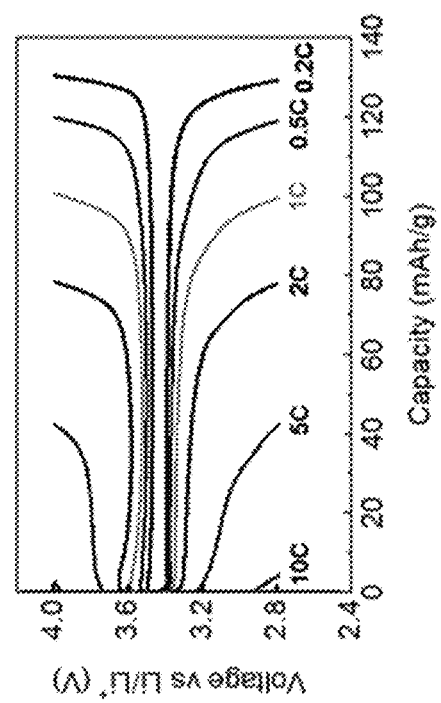
Figure 17D:
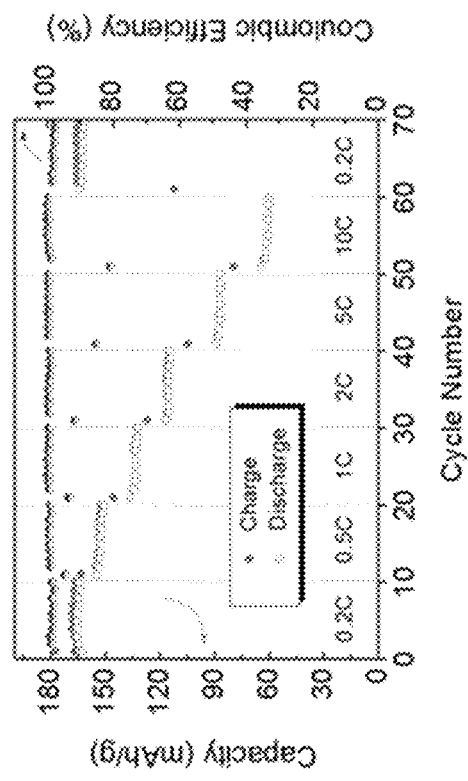
FIG. 17D depicts the charge and discharge profiles and rate capability of LFP on n-NiCotton.
Figure 17D:
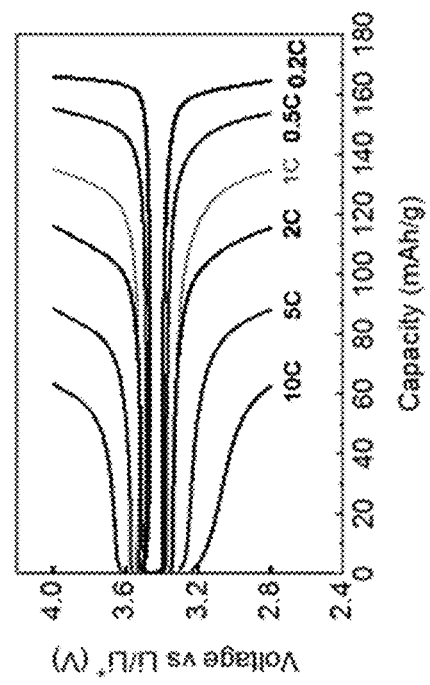
Figure 18:
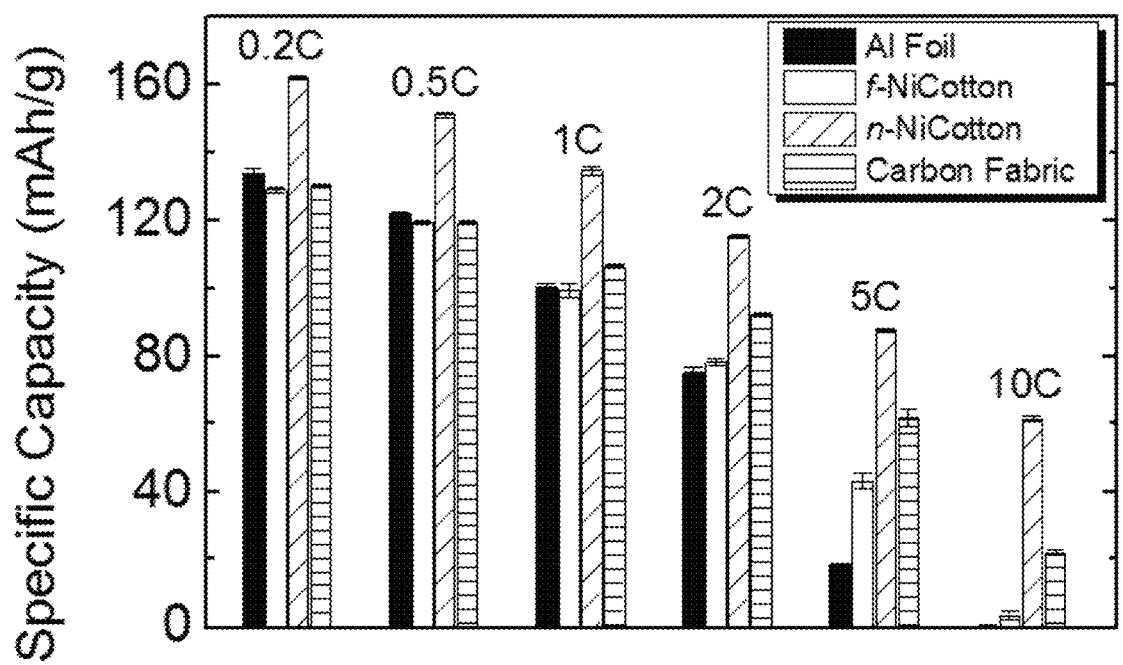
FIG. 18 depicts the comparison of the specific capacities for LFP on Al foil, f-NiCotton, n-NiCotton, and carbon fabric under various C ratio.

FIGS. 17A-17D shows the charge and discharge profiles and rate capability of LFP on Al foil, carbon fabric, f-NiCotton and n-NiCotton respectively. LFP/n-NiCotton cathode exhibits a mass loading of 7.3 mg/cm$^2$, taken over various C rates ranging from 0.2 to 10 C. Referring to FIG. 17D, the specific capacity of LFP reaches 161.9 mAh/g at 0.2 C, which is very close to its theoretical value of 170 mAh/g. In addition, this LFP/n-NiCotton cathode also shows good rate performance. The specific capacity of LFP remains at 134.5 mAh/g at 1 C. Even at a high rate of 10 C, the electrode still preserves a capacity of 61.5 mAh/g. For the LFP/Al electrode and LFP/f-NiCotton electrode, the specific capacity is about 130 mAh/g at a low current density of 0.2 C and is nearly zero under high C rate of 10. The LFP/carbon fabric shows better capacity at high current densities, which remains at 21.9 mAh/g at 10 C. As shown in FIG. 18, when comparing the specific capacities of LFP coating on n-NiCotton to those on Al foil, carbon fabric, and f-NiCotton, it is clear that the LFP/n-NiCotton electrode shows much better energy storage capability at all tested C rates. The structure of the n-NiCotton with a plurality of nickel protrusions 131 protruding from the nickel layer 121 improves the conductivity and surface area of the n-NiCotton, and therefore improved the specific capacities.

Figure 19C:
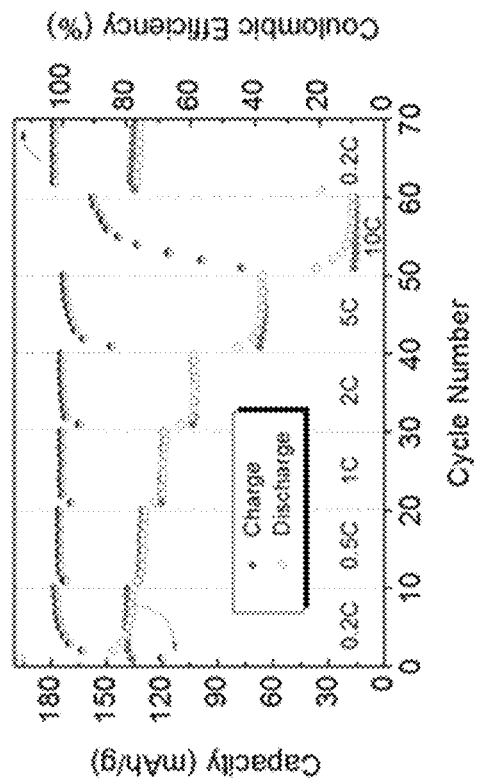
FIG. 19C depicts the charge and discharge profiles and rate capability of LTO on f-CuCotton.
Figure 19C:
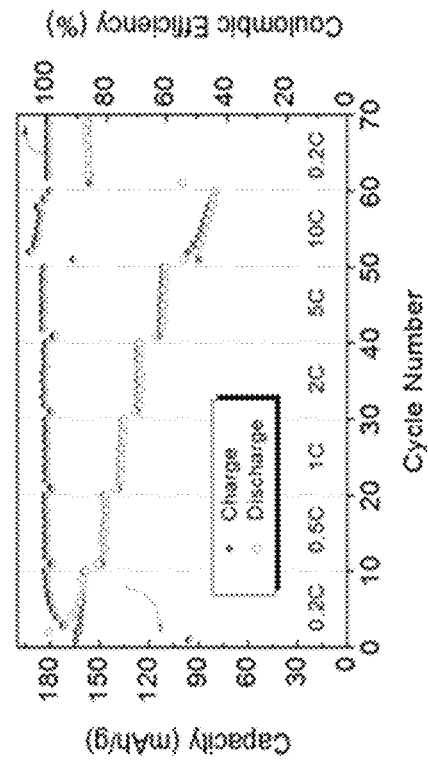
Figure 19D:
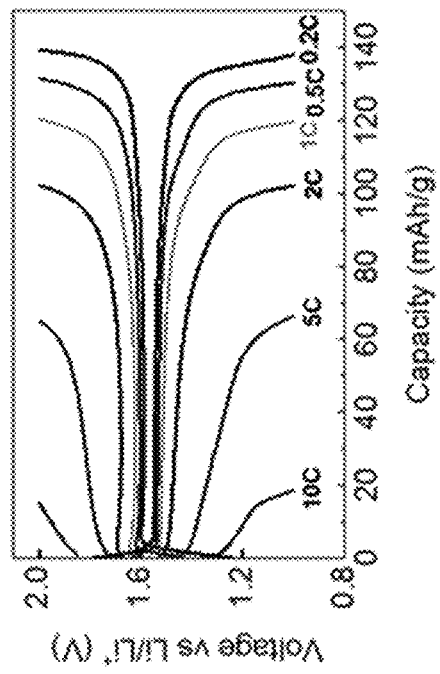
FIG. 19D depicts the charge and discharge profiles and rate capability of LTO on n-CuCotton.
Figure 19D:
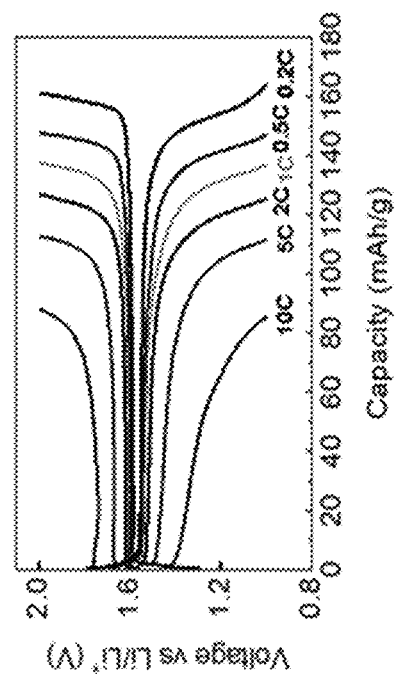
Figure 20:
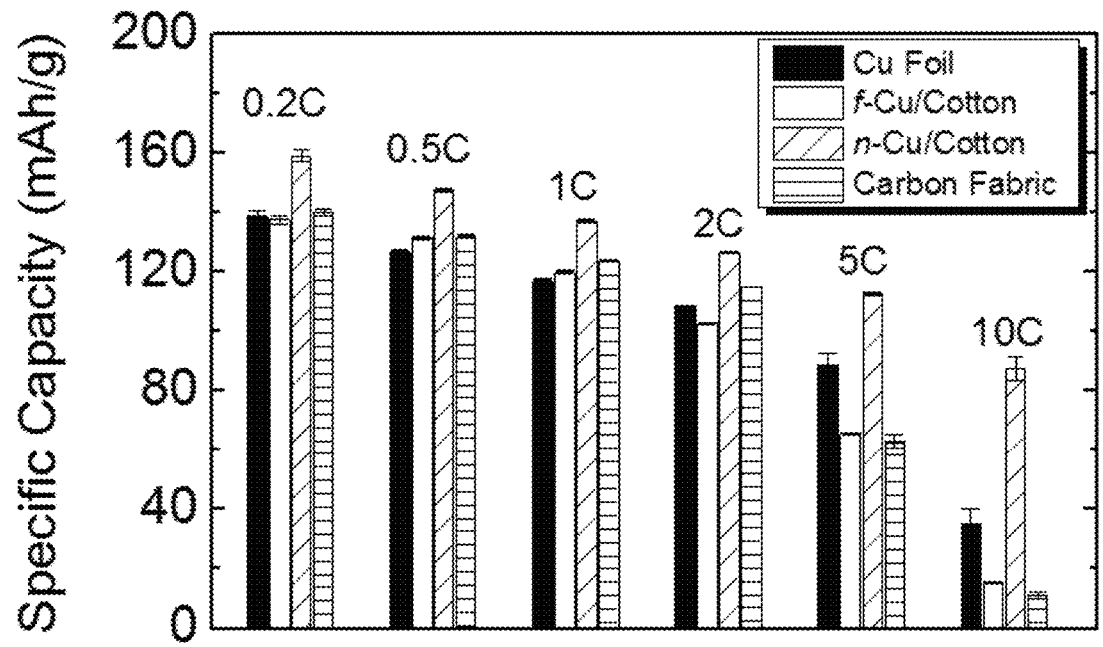
FIG. 20 depicts the comparison of the specific capacities for LTO on Cu foil, f-CuCotton, n-CuCotton, and carbon fabric under various C ratio.

FIGS. 19A-19D shows the charge and discharge profiles and rate capability of LTO on Cu foil, carbon fabric, f-CuCotton and n-CuCotton respectively. The galvanostatic discharging/charging results prove that using n-CuCotton as the current collector can largely improve the specific capacity of LTO under C rates from 0.2 to 10. However, as shown in FIG. 19A, the Coulumbic efficiency of the LTO/Cu foil electrode under high C rates such as 5 C and 10 C is rather unstable, suggesting that the electrons cannot be transported well under such high current densities. On the other hand, the LTO/carbon fabric or LTO/f-CuCotton electrodes have improved capacity under high C rates. The highest improvement in the capacity of LTO is obtained by using the n-CuCotton as the current collector. Referring to FIG. 20, the specific capacity of LTO at 0.2 C, 0.5 C, 1C, 2C, 5C, and 10 C reaches 159.0, 147.2, 137.0, 126.6, 112.6 and 87.5 mAh/g.

Figure 21A:
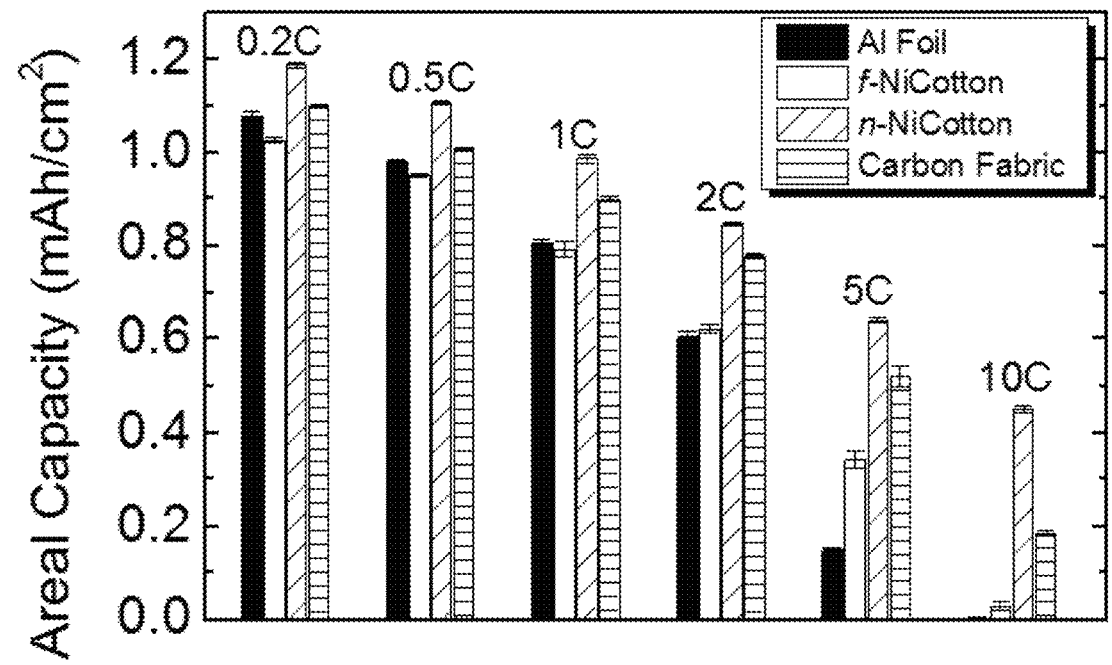
FIG. 21A depicts the comparison of the areal capacities for LFP on Al foil, f-NiCotton, n-NiCotton, and carbon fabric under various C ratio.
Figure 21B:
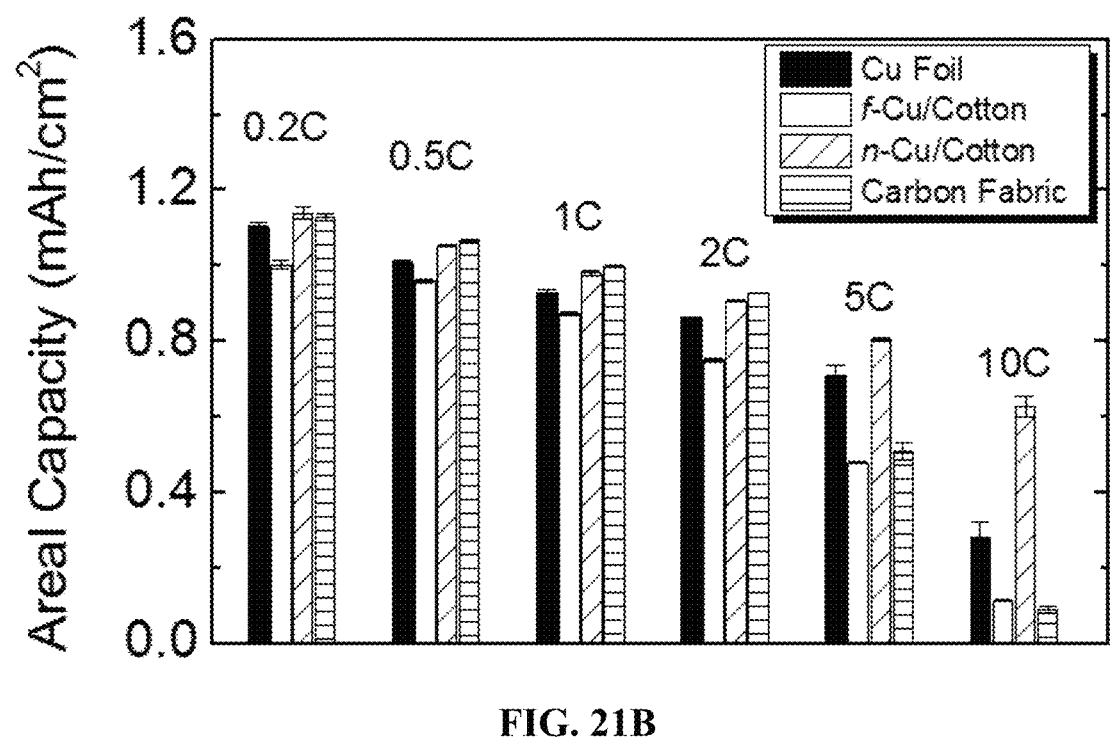
FIG. 21B depicts the comparison of the areal capacities for LTO on Cu foil, f-CuCotton, n-CuCotton, and carbon fabric under various C ratio.

FIGS. 21A and 21B provide the comparison of the areal capacities of LFP and LTO with their counterparts under various C rates respectively. The results show that the metallic fabrics 110 with nanostructured nickel coating and nanostructured copper coating are better choice than metal foil and carbon fabrics in improving the energy storage capability of the active materials, especially under high current densities. With the foregoing results, the n-NiCotton and n-CuCotton are used as current collectors to fabricate a flexible full LIB.

Figure 22:
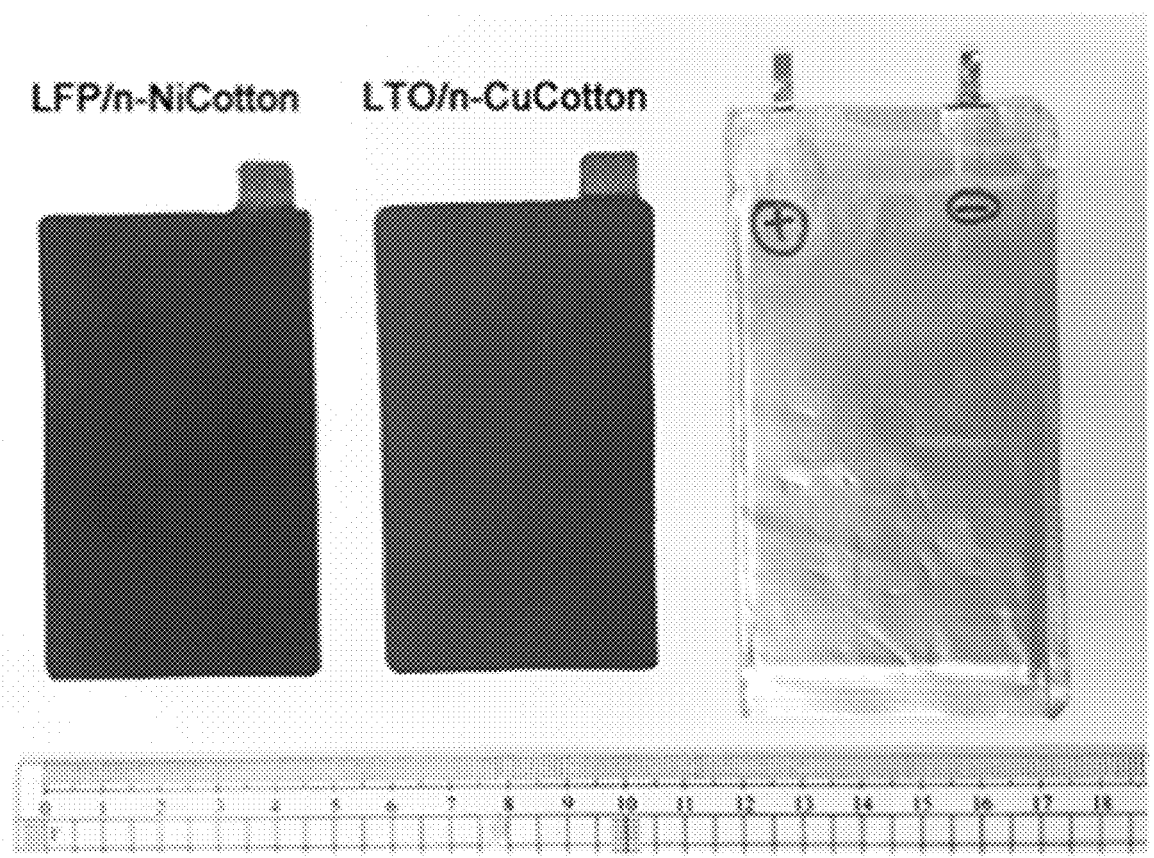
FIG. 22 shows the LFP/n-NiCotton electrode, LTO/n-CuCotton electrode, and an assembled full cell.
Figure 23:
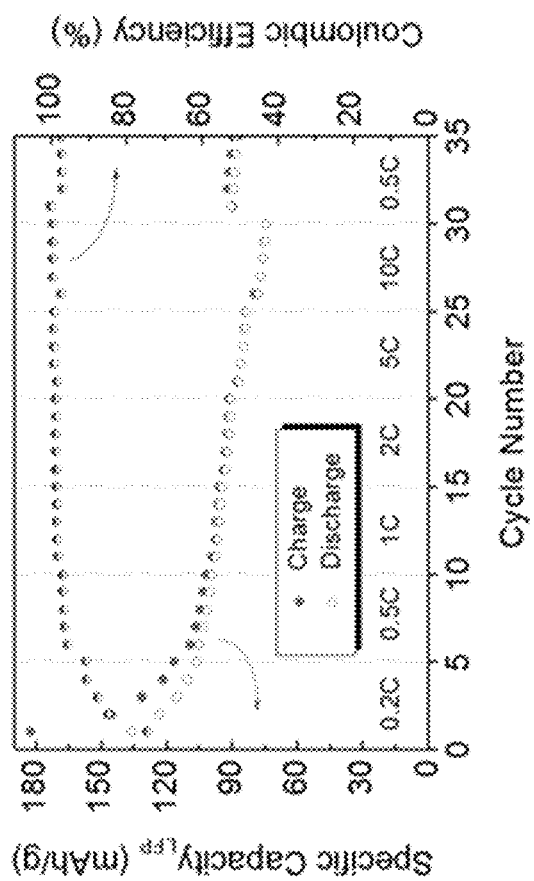
FIG. 23 depicts the charge and discharge profiles of the metallic cotton fabric-based full cell.
Figure 23:
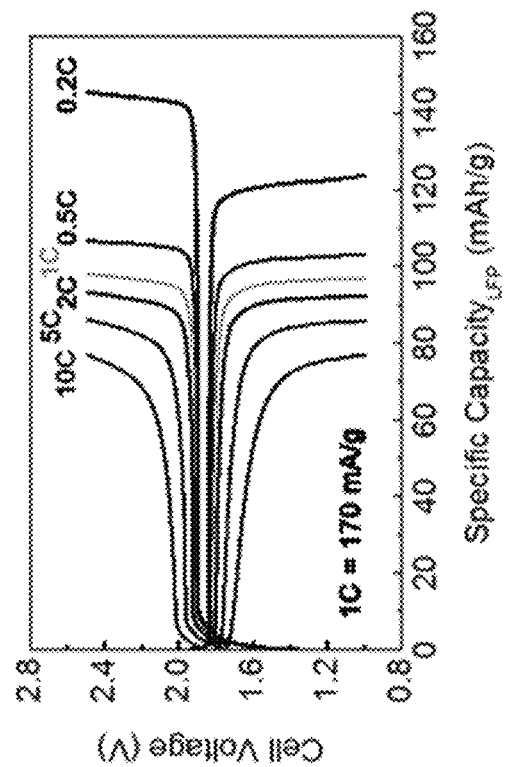

As shown in FIG. 22, the LFP/n-NiCotton and LTO/n-CuCotton electrodes are prepared by matching and assembling into full cells with the electrode size of 80 mm×46 mm. The total thickness of the obtained full battery is about 700 µm, in which the two encapsulation layers of Al laminated film are about 300 µm. The resulting LFP/n-NiCotton//LTO/n-CuCotton full cell is tested to verify the performance. FIG. 23 provides the galvanostatic charging/discharging voltage profiles and rate performance. The battery presents stable voltage plateaus under various C rates from 0.2 to 10 C. Under a low current density of 0.2 C, the voltage plateaus for charging and discharging are 1.90 V and 1.83 V, respectively. The differential voltage between charging and discharging is gradually amplified to approximately 0.4 V when the current density is increased from 0.2 to 10 C. The battery delivers averaged reversible capacities of 118.5, 101.7, 96.1, 91.6, 84.9, and 75.9 mAh/g (for LFP) under C rates of 0.2, 0.5, 1, 2, 5 and 10. These values are slightly lower than those achieved in LFP-based half cells, which should be mainly induced by the low Coulombic efficiencies under low current densities. When the current density goes back down to 0.5 C from 10 C, the battery resumes the specific capacity to 90.3 mAh/g with a relatively good stability.

Figure 24:
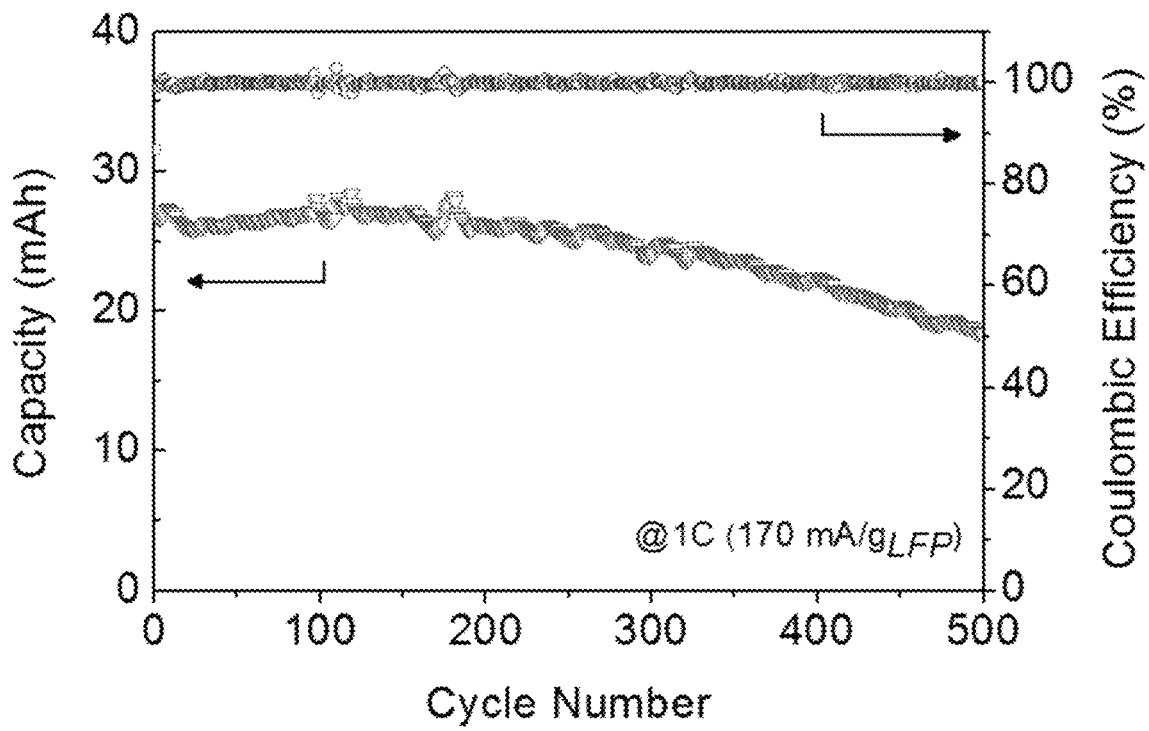
FIG. 24 depicts a cycling performance of the metallic cotton fabric-based full cell.

FIG. 24 provides the analysis on the cycling performance of a full cell device under 1C. The discharged capacity decays from its initial value of 27.0 mAh to 23.9 mAh after 300 cycles, and further drops to 18.5 mAh after 500 cycles. The capacity retention of the full cell under 1 C is therefore 88.5% at 300 cycles and 68.5% at 500 cycles.

Figure 25:
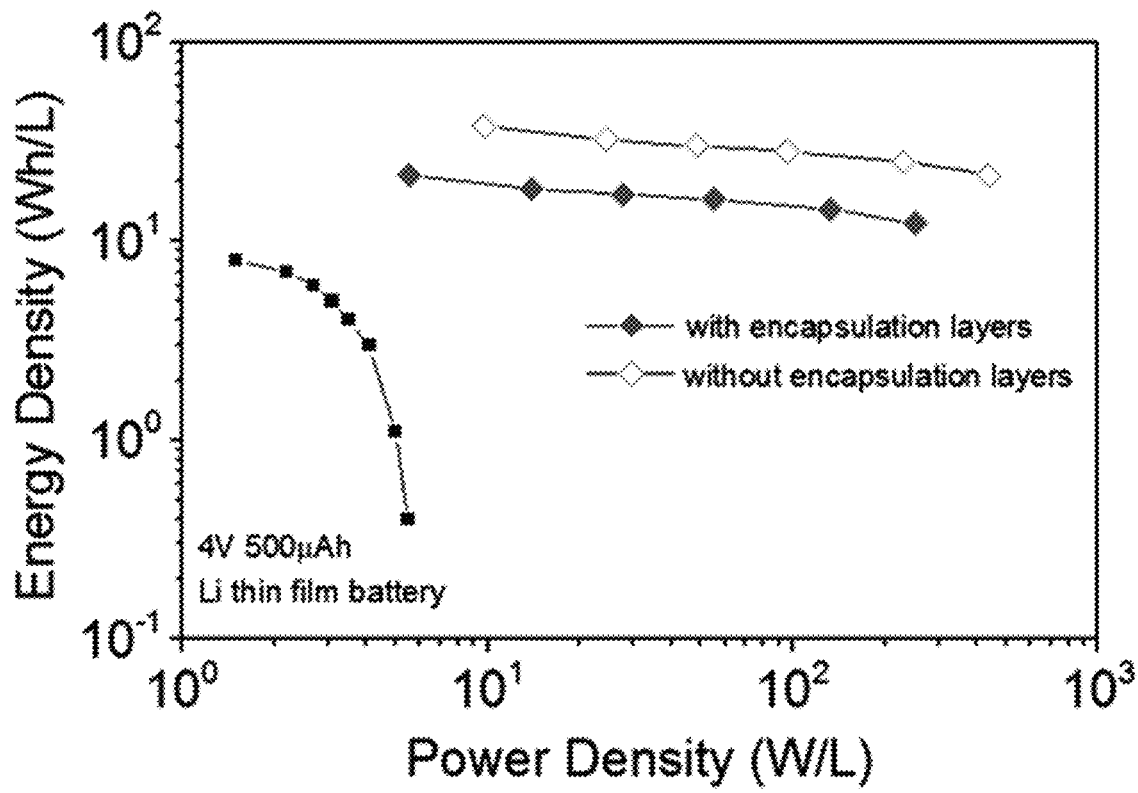
FIG. 25 depicts the ragone plot of the metallic cotton fabric-based full battery.

FIG. 25 is the Ragone plot of the full cell device. From the results, the full cell can deliver an energy density of 21 Wh/L under a power density of 439 W/L. Taking the volume occupied by Al-plastic encapsulation film into consideration, the energy density and the power density drop to 12 Wh/L and 251 W/L, respectively. The relatively low energy density can be easily enhanced by utilizing more energetic active material pairs such as LFP/graphite, or by double-sided coating of active materials on the metallic fabric and stacking multilayers of the electrodes.

Figure 26:
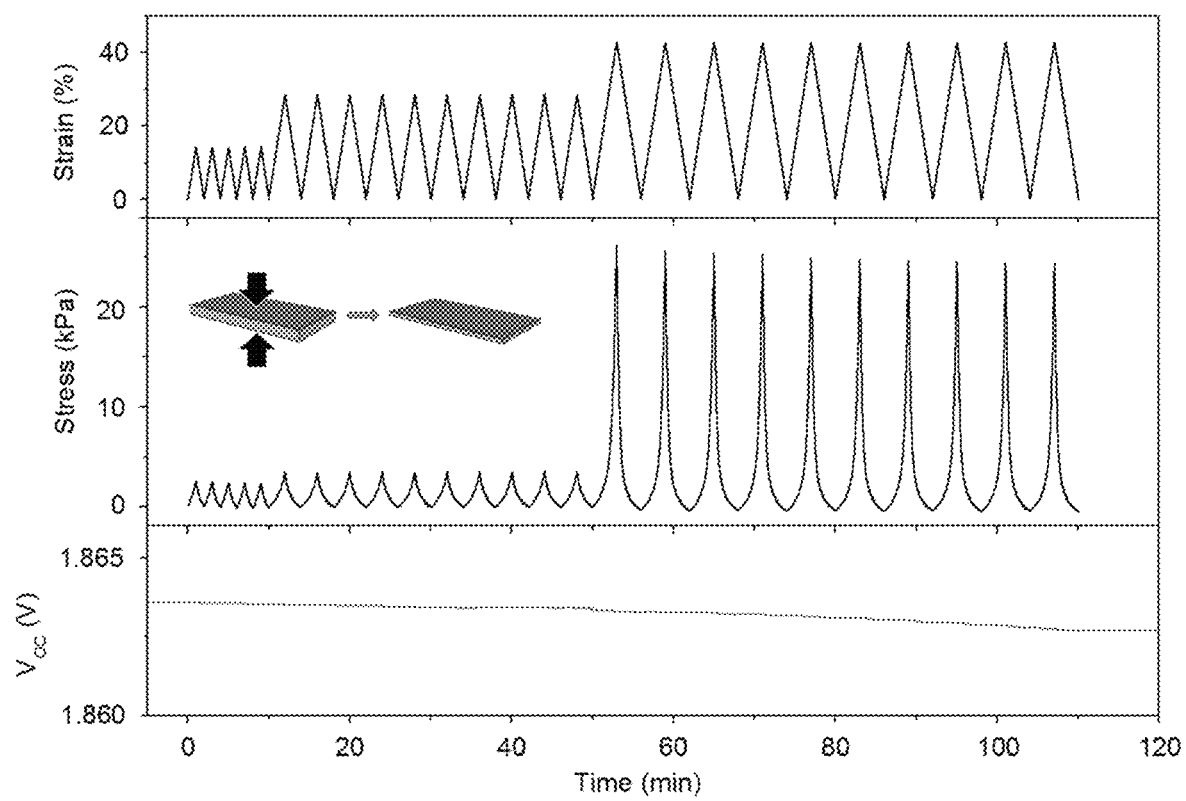
FIG. 26 depicts a graph showing the open-circuit voltage of the metallic cotton fabric-based full cell when undergoing mechanical deformations.

Advantageously, the as-fabricated metallic cotton fabric-based full battery presents superior stability when undergoing mechanical deformations. By monitoring the open-circuit voltage (Voc) of the LFP/n-NiCotton//LTO/n-CuCotton full cell under compression and folding, as shown in FIG. 26, the full cell can deform reversibly in thickness direction when applying a compression strain as high as 42.9%. The compressive stress and the change in Voc are quite small when lower strain of 14.3% and 28.6% are applied. The compressive stress is dramatically enhanced to 25 kPa when the strain is improved to 42.9%. At the same time, the Voc drops ~1 mV during the 10 cycles of 42.9% of compression strain. As a result, the full LIB can withstand a high compression without short circuit.

Figure 27:
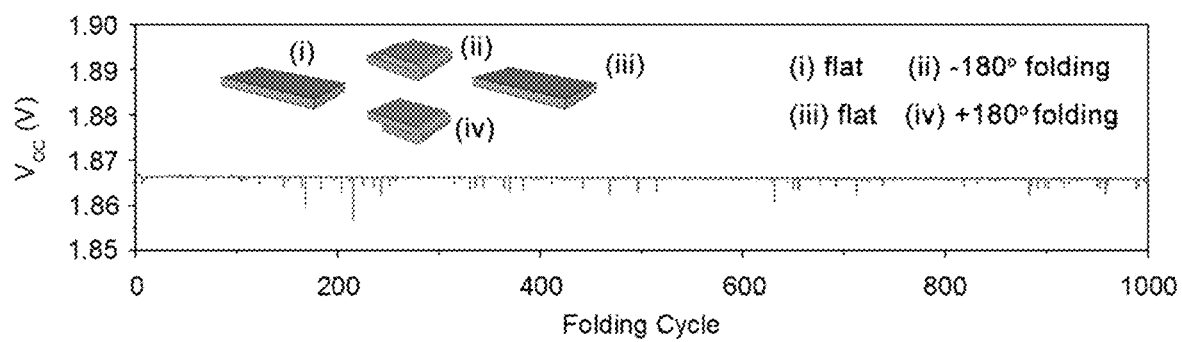
FIG. 27 depicts a graph showing the open-circuit voltage of the metallic cotton fabric-based full cell when undergoing folding-unfolding cycles.
Figure 28:
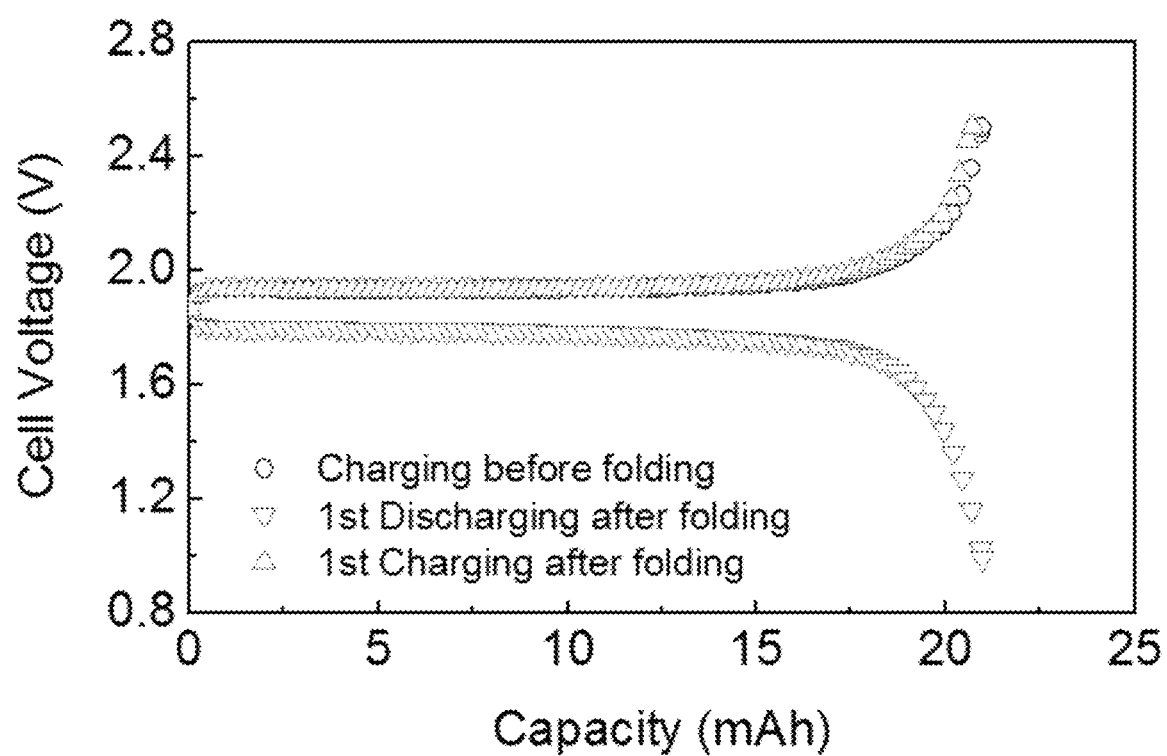
FIG. 28 depicts the charging voltage profiles before and after 1000 folding cycles.

The advantage of possessing mechanical stability can also be demonstrated by testing the Voc of the full cell under folding-unfolding cycles. As shown in FIG. 27, the folding and unfolding operations to the full cell can only cause a Voc fluctuation of less than 10 mV. As shown in FIG. 28, the charging voltage profiles before and after 1000 folding cycles are nearly the same. This demonstrates that mechanical folding have a very minor influence on the electrochemical performance of the full cell.

The applicability of the metallic cotton fabric-based full battery is also confirmed by arranging a fully charged metallic cotton fabric-based full battery to power a 1.5V time monitor. In the experiment, when harsh mechanical deformations including arbitrary folding, squeezing, even heavily compacting with hammer were applied, the device can still stably output the stored electrochemical energy. The Voc of the battery during folding and squeezing was also monitored by using a voltmeter. The Voc was stabilized at 1.858 V all the time, proving this kind of battery can work well as stable energy provisions under daily wearing conditions.

The present disclosure provides an electrode for LIBs, comprising an active material and a metallic fabric 110 surface-coated with a nickel layer 121 or copper layer 122 with a plurality of protrusions 131, 132 as current collectors 161, 162. The active materials 141, 142 can be attached to the protrusions of the metallic fabric 110, such that the metallic fabric 110 has a high electrical conductivity and a high mechanical stability. The metallic fabric 110 demonstrates outstanding performance for the use as a current collector of a LIB for the following reasons. (1) The hierarchical structure of cotton fabric 100, including the particular hollow tube structure of natural cotton fiber 101 and the twisting and woven structure of cotton yarns, endows the substrate with high strength and high tolerance to external tensile/compressive/twisting strains. (2) The strong chemical bonding of metal layer on the cotton fiber 101 surface inherits the great mechanical stability of the textile structure. The nickel and copper coating layers can be prepared through a polymer brush-assisted ELD process. The high density of hydroxyl groups 230 on cotton cellulose fibers enables the efficient grafting of polyelectrolyte brushes, and subsequently triggers high-concentrated Pd-catalyzed ELD. The interlock structure through the polyelectrolyte brush combines the chemically derived metal nanoparticles strongly onto the cotton fibers 101. (3) The thickness and surface morphology of the nickel and copper coating layers can be tuned to balance the contradiction between high electrical conductivity and low fatigue strength of the metallic materials. In certain embodiments, the ELD layer of the nickel and copper are controlled to be ca. 400-600 nm. Such uniform and thin metal layers provide, simultaneously, low sheet resistance and high tolerance to mechanical folding. Moreover, the nanostructure of nickel and copper further increases the effective surface area of metal, which is beneficial to enhance the contact of active materials 141, 142 with current collector 161, 162, and therefore boosting the electron transport and material adhesion.

Figure 29A:
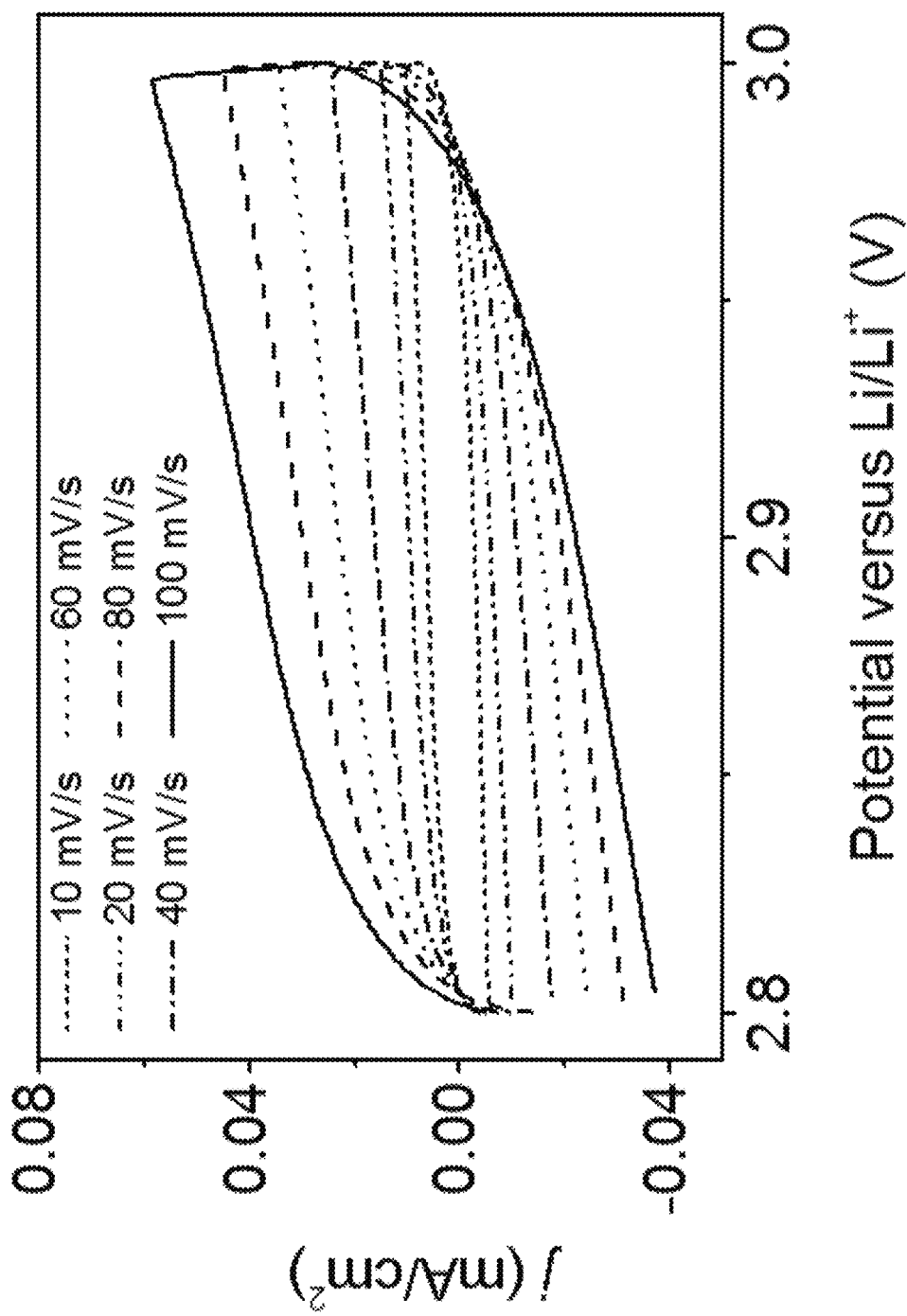
FIG. 29A depicts the cyclic voltammagrams of the electrode cells using LFP/n-NiCotton.
Figure 29B:
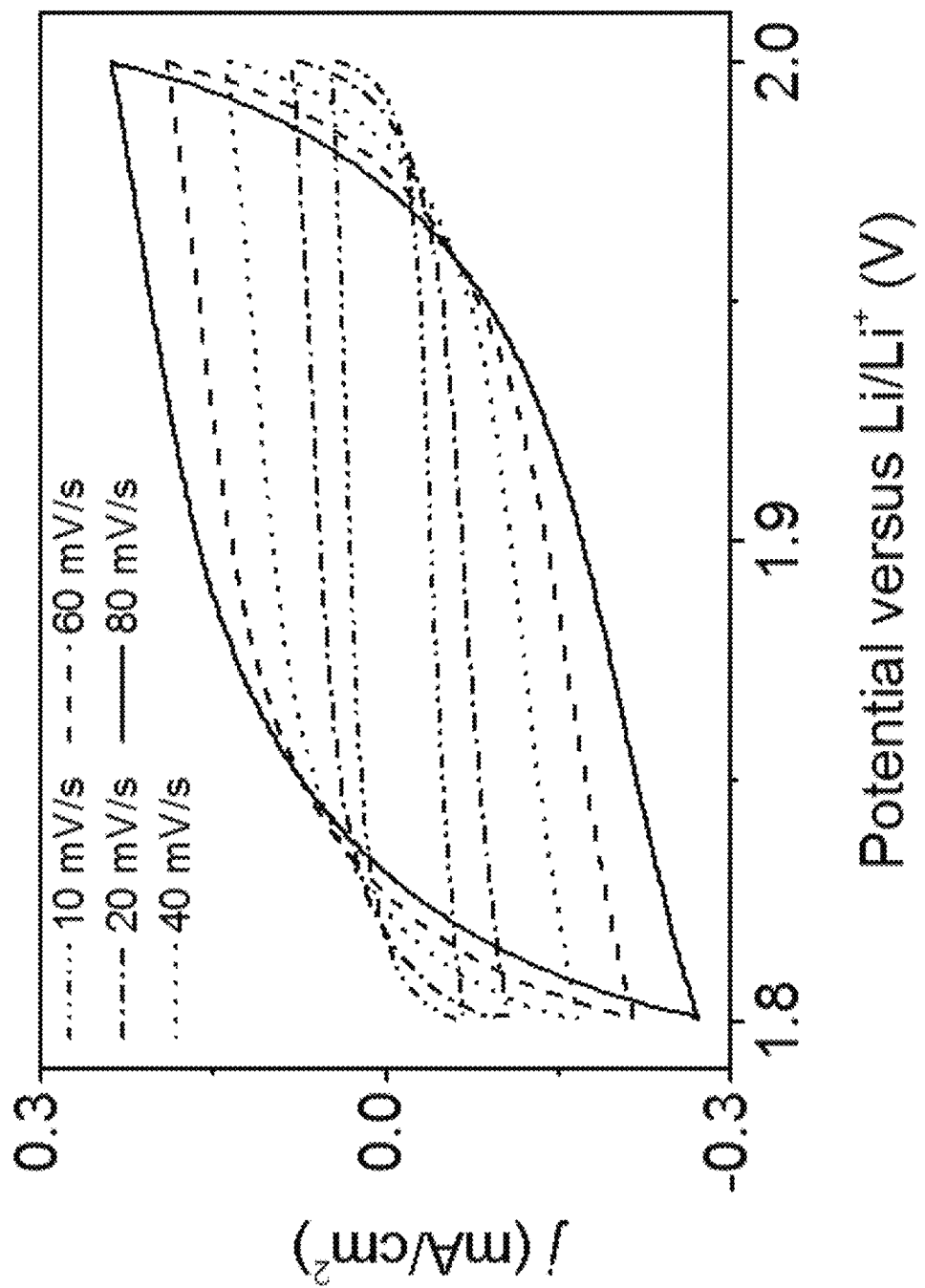
FIG. 29B depicts the cyclic voltammagrams of the electrode cells using LTO/n-CuCotton.
Figure 30A:
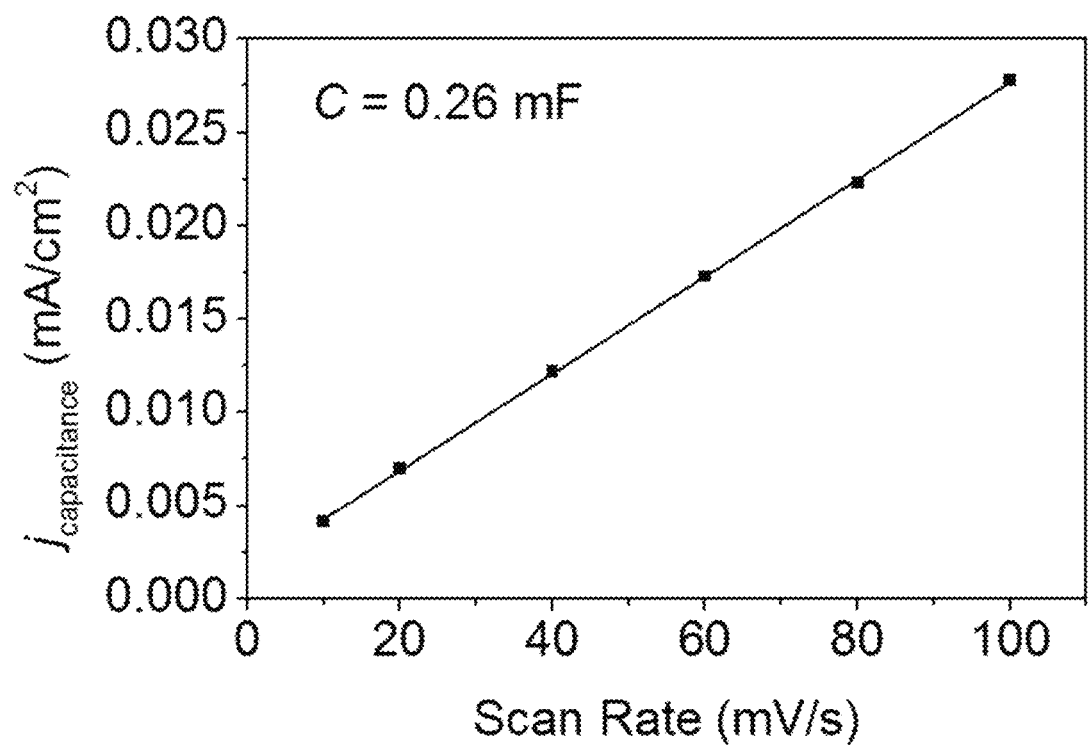
FIG. 30A depicts the current due to electrochemical double-layer capacitance (EDLC) charging versus cyclic voltammetry scan rate of the electrode cells using LFP/n-NiCotton.
Figure 30B:
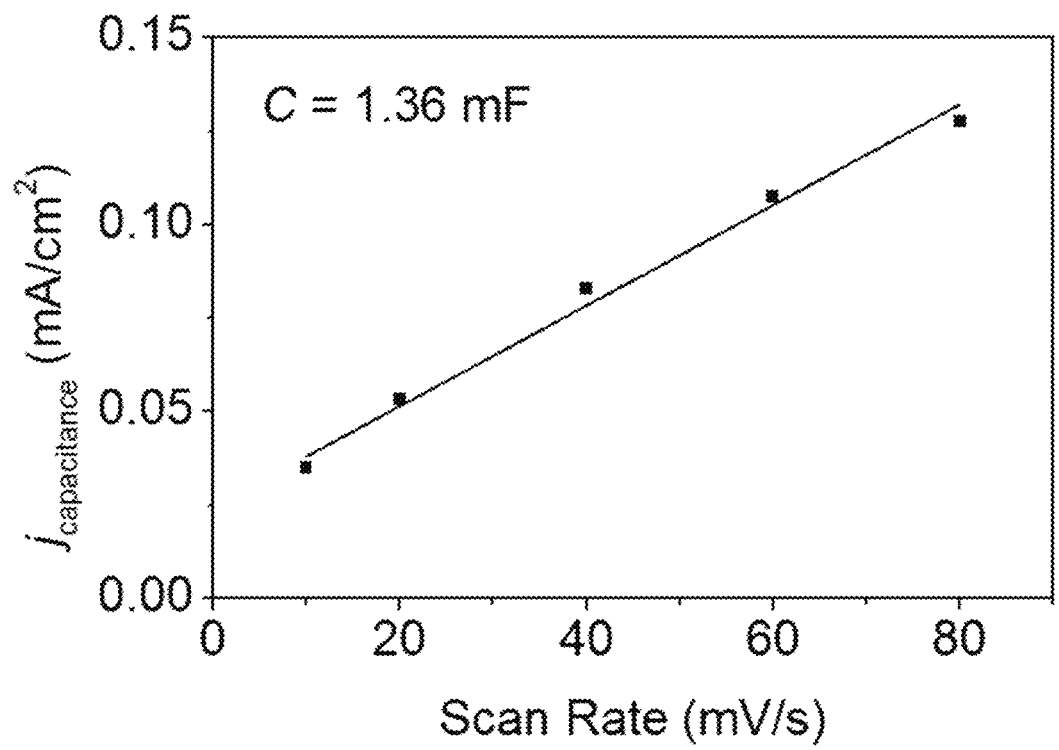
FIG. 30B depicts the current due to EDLC charging versus cyclic voltammetry scan rate of the electrode cells using LTO/n-CuCotton.

Electrochemical active surface area (ECASA) of the metallic fabrics 110 can be estimated by measuring their electrochemical double-layer capacitance. FIGS. 29A and 30A provide the determination of electrochemical double-layer capacitance (EDLC) of n-NiCotton fabric, which was prepared through 60 min electroless deposition and 15 min electrodeposition. FIGS. 29B and 30B provide the determination of EDLC of n-CuCotton fabric which was prepared through 150 min electroless deposition. FIGS. 29A and 29B are cyclic voltammagrams of two electrode cells in which the metallic fabrics act as the work electrode and the Li metal is the counter and reference electrode. FIGS. 30A and 30B provide the current due to EDLC charging versus cyclic voltammetry scan rate, the capacitance for n-NiCotton and n-CuCotton, which can be obtained by fitting the slope, are 0.26 mF and 1.36 mF respectively.

Figure 31A:
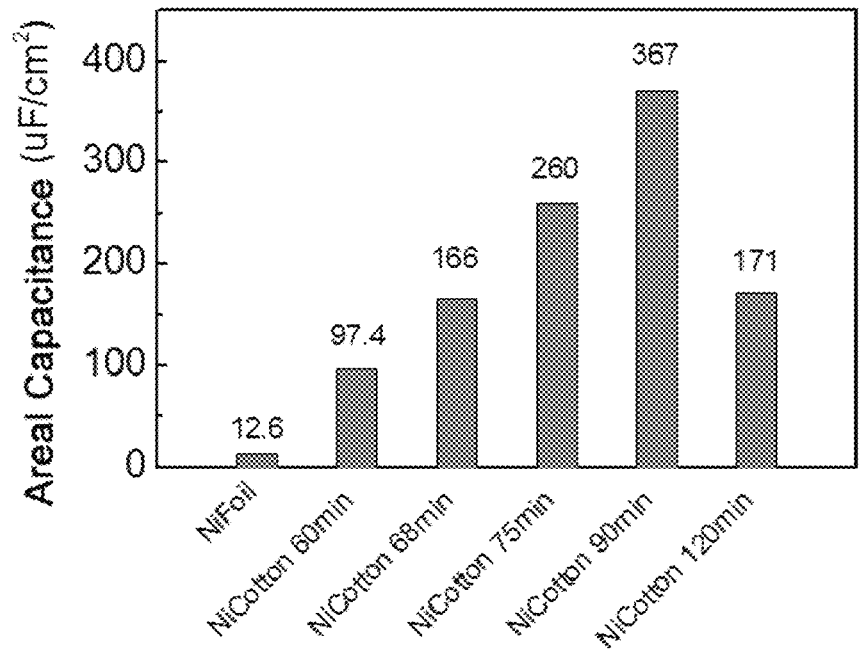
FIG. 31A depicts a chart comparing the areal capacitance of NiCotton with their metal foil counterpart.
Figure 31B:
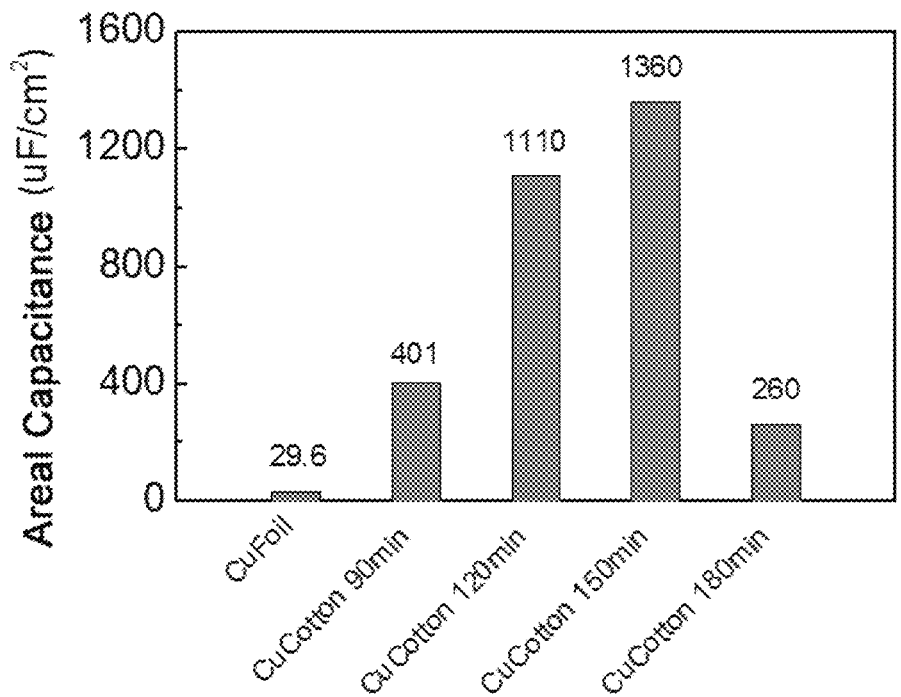
FIG. 31B depicts a chart comparing the areal capacitance of CuCotton with their metal foil counterpart.

Referring to FIGS. 31A and 31B, the metallic fabrics 110 exhibit much higher areal capacitance than their metal foil counterpart does. The electrochemical active surface area factors of Ni foil and Cu foil are defined to be 1 and used as the references to determine the factors of other NiCotton and CuCotton fabrics, respectively. The measurements yield ECASA factors of 8, 21, 14, and 46 for f-NiCotton, n-NiCotton, f-CuCotton, and n-CuCotton when taking the flat Ni and Cu foils as the reference, as shown in Table 1 below. This means that the effective ECASA for lithium ion transport can be enhanced by about 10 times when using the f-NiCotton and f-CuCotton to replace metal foils in LIBs. Moreover, the ECASA is further improved by about 3 times after introducing the nanostructured nickel and copper protrusions. In certain embodiments, the n-NiCotton has an electrochemical active surface area having an areal capacitance in a range of 160 $\mu F/cm^2$ to 400 $\mu F/cm^2$, and the n-CuCotton has an electrochemical active surface area having an areal capacitance in a range of 400 $\mu F/cm^2$ to 1400 $\mu F/cm^2$. The highly improved ECASA of n-NiCotton and n-CuCotton guarantees high interface area between the metallic fabrics and the active materials, which offers more pathways for electron transport from active materials to current collector, shortening the effective distance of charge carrier transport, and thereby, improving lithiation/delithiation kinetics of the electrodes.

TABLE 1

Capacitance measured using cyclic voltammetry for metal foils and metallic cotton fabrics

| Sample | Capacitance ($\mu F/cm^2$) | Electrochemical active surface area (ECASA) factor |
| --- | --- | --- |
| Ni foil | 12.6 | 1 |
| f-NiCotton, after 60 min ELD | 97.4 | 8 |
| NiCotton, after 60 min ELD and 8 min EP | 166 | 13 |
| n-NiCotton, after 60 min ELD and 15 min EP | 260 | 21 |
| NiCotton, after 60 min ELD and 30 min EP | 367 | 29 |
| NiCotton, after 60 min ELD and 60 min EP | 171 | 14 |
| Cu foil | 29.6 | 1 |
| f-CuCotton, after 90 min ELD | 401 | 14 |
| CuCotton, after 120 min ELD | 1110 | 38 |
| n-CuCotton, after 150 min ELD | 1360 | 46 |
| CuCotton, after 180 min ELD | 260 | 9 |

Figure 32A:
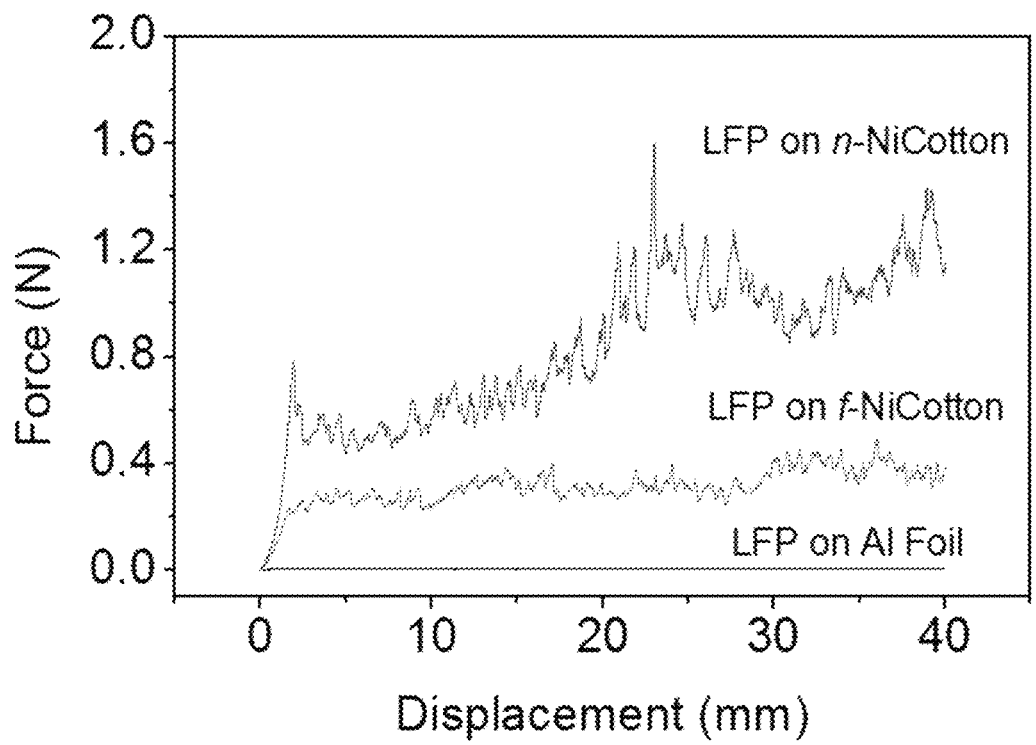
FIG. 32A depicts the adhesion force curves for LFP/Al, LFP/f-NiCotton, and LFP/n-NiCotton electrodes.
Figure 32B:
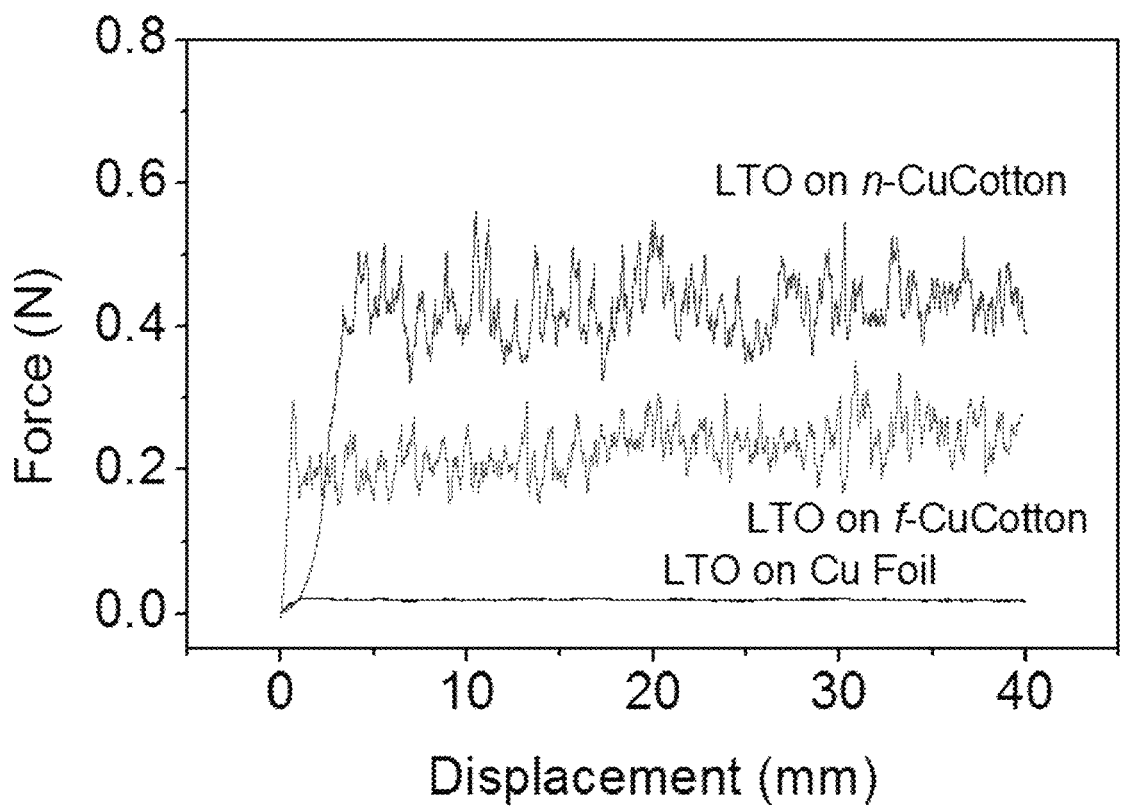
FIG. 32B depicts the adhesion force curves for LTO/Cu, LTO/f-CuCotton, and LTO/n-CuCotton electrodes.

In order to determine the effect of nanostructured metal on the adhesion of active materials 141, 142, the peeling strength of LFP and LTO electrodes away from various current collectors 161, 162 were investigated by pulling off an adhesive tape at 180° under a constant rate of 10 mm/min. As shown in FIG. 32A, the adhesion force of LFP-based electrode is dramatically improved from ~0.004 N to ~0.3 N by alternating the Al foil with f-NiCotton fabric. This value is further increased to ~0.6 N by utilizing the n-NiCotton as the current collector. Now referring to FIG. 32B, the trend for LTO-based electrodes is consistent with the results for LFP-based electrodes. The adhesion force of LTO on Cu foil, f-CuCotton fabric, and n-CuCotton fabric are about 0.02 N, 0.2 N, and 0.4 N, respectively. Therefore, the structure of the metallic fabrics 110 can efficiently prevent the peeling off of active materials 141, 142. The nanostructured metal on the cotton fabrics 100 largely increases the adhesion behaviors between the electrode layer and the current collector 161, 162, providing improved structural stability to mechanical deformations.

It will be apparent to those skilled in the art that various modifications and variations can be made to the method and the system of the present invention without departing from the scope or spirit of the present disclosure. In view of the foregoing descriptions, it is intended that the present disclosure covers modifications and variations if they fall within the scope of the following claims and their equivalents.

What is claimed is:

1. An electrode for a battery comprising:
   an active material; and
   a fabric comprising one or more fibers, each fiber covered by a copper coating thereby forming a foldable metallic fabric, the copper coating comprising a copper layer and a plurality of copper protrusions protruding from the copper layer such that each copper protrusion has a root formed on the copper layer;
   wherein the active material is attached to at least some of the plurality of copper protrusions; and
   wherein respective roots of the plurality of copper protrusions evenly cover all fiber surface of each fiber.

2. The electrode of claim 1, wherein each copper protrusion has a height in a range of 100 nm to 5 μm.

3. The electrode of claim 1, wherein each copper protrusion has a width in a range of 10 nm to 1 μm.

4. The electrode of claim 1, wherein the copper layer has a thickness in a range of 100 nm to 1 μm.

5. The electrode of claim 1, wherein each copper protrusion has a height in a range of 100 nm to 5 μm and a width in a range of 10 nm to 1 μm; and the copper layer has a thickness in a range of 100 nm to 1 μm.

6. The electrode of claim 1, wherein the active material is sulfur, silicon, lithium metal, lithium titanate, lithium iron phosphate, lithium cobalt oxide or lithium manganite.

7. A battery comprising the electrode of claim 1.

8. The battery of claim 7, wherein the active material is lithium titanate; each copper protrusion has a height in a range of 100 nm to 5 μm and a width in a range of 10 nm to 1 μm; and the copper layer has a thickness in a range of 100 nm to 1 μm.

* * * * *